US012790753B2

(12) United States Patent
Clement et al.

(10) Patent No.: US 12,790,753 B2
(45) Date of Patent: Nov. 10, 2026

(54) BOARD, METHOD OF MANUFACTURING A BOARD AND A PANEL COMPRISING SUCH BOARD MATERIAL

(71) Applicant: FLOORING INDUSTRIES LIMITED, SARL, Bertrange (LU)

(72) Inventors: Benjamin Clement, Waregem (BE); José Meirlaen, Deinze (BE); Marijn Seynaeve, Moen (BE)

(73) Assignee: Unilin BV, Wielsbeke (BE)

( * ) Notice: Subject to any disclaimer, the term of this patent is extended or adjusted under 35 U.S.C. 154(b) by 921 days.

(21) Appl. No.: 17/904,338

(22) PCT Filed: Feb. 15, 2021

(86) PCT No.: PCT/IB2021/051240

§ 371 (c)(1),
(2) Date: Aug. 16, 2022

(87) PCT Pub. No.: WO2021/165812

PCT Pub. Date: Aug. 26, 2021

(65) Prior Publication Data

US 2023/0079984 A1 Mar. 16, 2023

Related U.S. Application Data

(60) Provisional application No. 63/119,417, filed on Nov. 30, 2020, provisional application No. 62/977,455, filed on Feb. 17, 2020.

(30) Foreign Application Priority Data

Feb. 2, 2021 (WO) .................. PCT/IB2021/050832

(51) Int. Cl.
*D21J 1/08* (2006.01)
*B32B 5/06* (2006.01)
(Continued)

(52) U.S. Cl.
CPC ............... *D21H 17/64* (2013.01); *B32B 5/06* (2013.01); *B32B 21/04* (2013.01); *D21H 17/57* (2013.01);
(Continued)

(58) Field of Classification Search
None
See application file for complete search history.

(56) References Cited

U.S. PATENT DOCUMENTS 4,315,967 A 2/1982 Prior et al.
7,947,765 B2 5/2011 Swift et al.
(Continued)

FOREIGN PATENT DOCUMENTS

CA 2957138 A1 2/2016
CN 106088369 A 11/2016
(Continued)

OTHER PUBLICATIONS

English translation of CN110128097 to Ke.*
(Continued)

*Primary Examiner* — Yan Lan
(74) *Attorney, Agent, or Firm* — Workman Nydegger

(57) ABSTRACT

Boards have a mineral content, including magnesiumoxychloride and/or magnesiumoxysulphate, and may be finished with a DPL laminate decorative layer.

8 Claims, 8 Drawing Sheets

(51) Int. Cl.

| | |
|---|---|
| ***B32B 21/04*** | (2006.01) |
| ***D21H 17/00*** | (2006.01) |
| ***D21H 17/57*** | (2006.01) |
| ***D21H 17/64*** | (2006.01) |
| ***D21H 17/66*** | (2006.01) |
| ***D21H 17/67*** | (2006.01) |
| ***D21H 27/20*** | (2006.01) |

(52) U.S. Cl.

CPC ........... *D21H 17/66* (2013.01); *D21H 17/675* (2013.01); *D21H 17/73* (2013.01); *D21H 27/20* (2013.01); *D21J 1/08* (2013.01); *B32B 2255/02* (2013.01); *B32B 2260/028* (2013.01); *B32B 2307/4023* (2013.01)

(56) References Cited

U.S. PATENT DOCUMENTS

| | | | | |
|---|---|---|---|---|
| 9,611,659 | B2 * | 4/2017 | Baert | E04F 13/077 |
| 12,109,790 | B1 | 10/2024 | Drevet et al. | |
| 2003/0219580 | A1 | 11/2003 | Tagge et al. | |
| 2020/0047469 | A1 | 2/2020 | Fang | |

FOREIGN PATENT DOCUMENTS

| | | | |
|---|---|---|---|
| CN | 106827770 | A | 6/2017 |
| CN | 107268945 | A | 10/2017 |
| CN | 110128097 | * | 8/2019 |
| EP | 2060389 | A1 | 5/2009 |
| GB | 2133427 | A | 7/1984 |
| WO | 9747834 | A1 | 12/1997 |
| WO | 2006066776 | A2 | 6/2006 |
| WO | 2006108446 | A1 | 10/2006 |
| WO | 2010070605 | A2 | 6/2010 |
| WO | 2011077311 | A2 | 6/2011 |
| WO | 2011141849 | A2 | 11/2011 |
| WO | 2017172959 | A1 | 10/2017 |
| WO | 2018172959 | A2 | 9/2018 |
| WO | 2018229649 | A1 | 12/2018 |
| WO | 2019064113 | A1 | 4/2019 |
| WO | 2019240838 | A1 | 12/2019 |
| WO | 2020095196 | A1 | 5/2020 |
| WO | 2020114645 | A1 | 6/2020 |

OTHER PUBLICATIONS

Effect of Ion Corrosion on 517 Phase Stability, Materials 2020, to Wang et al., (Year: 2020).*

International Search Report from corresponding PCT Application No. PCT/IB2021/050832, Mar. 24, 2021.

International Search Report from corresponding PCT Application No. PCT/IB2021/051240, Apr. 29, 2021.

* cited by examiner

BOARD, METHOD OF MANUFACTURING A BOARD AND A PANEL COMPRISING SUCH BOARD MATERIAL

BACKGROUND

The present invention relates to boards and coated panels comprising such boards, as well as to methods for manufacturing boards and coated panels comprising such boards.

In the field of decorative surfaces, such as floor panels or furniture panels several types of board materials have been in use. WO 97/47834 and WO 2010/070,605 disclose the use of wood-based panels, such as MDF or HDF or wood particle board. Such panels have the disadvantage of being prone to damage due to absorption of water and of lacking dimensional stability in a climate with changing relative humidity.

WO 2011/077,311 and WO 2011/141,849 disclose plastic based boards that in some cases may comprise filler materials and/or may be foamed, such as boards comprising closed cell foamed polyvinyl chloride (PVC). These boards are resistant to water or moisture, but sometimes lack rigidity and lack dimensional stability when exposed to a climate with changing temperature.

WO 2006/108,446, WO 2017/172,959 and WO 2019/064,113 disclose mineral based boards for example based on Portland cement or magnesiumoxide (MgO), also known as Sorel cement. These boards are a lot more dimensionally stable than the wood-based or plastic-based boards of the prior art. These boards are however prone to absorption of water and long term disadvantageous effects may originate as a result. Furthermore these boards are brittle and difficult to provide with a qualitative and lasting glueless coupling system. In WO 2019/064,113 it is proposed to incorporate two glass fiber fabrics in the critical areas of the click system in order to prevent damage and subsequent loss of strength. Furthermore, decoration of such boards with e.g. melamine based top layers may be challenging, especially using short cycle presses in e.g. a DPL process in which one or more resin provided paper layers are cured, consolidated and adhered to a board using a heated pressing operation. The obtained delamination strength may be insufficient, and structuring the melamine finish by means of a structured press element in one and the same pressing operation is challenging.

SUMMARY

The present invention in particular concerns new types of boards that are based on MgO and MgChloride, e.g. a board of so called MOC or magnesiumoxychloride, or that are based on MgO and MgSulphate, e.g. a board of so-called MOS or magnesiumoxysulphate.

Such boards are known per se, e.g. from the above mentioned WO 2019/064,113, but may show problems of leaching of corrosive substances and/or unpleasant odors, e.g. when exposed to water. Further, such boards show certain other disadvantages when being applied as decorative coated panel, such as floor panels, wall panels or ceiling panels, of which some have been elucidated above.

WO 2019/240,838 discloses a board based on MgO and MgChloride with increased chemical stability due to the addition of phosphoric acid.

The present invention in the first place seeks to provide alternative boards, and methods of manufacturing such boards, wherein in accordance with several preferred embodiments a solution is obtained for problems with the boards of the state of the art.

According to preferred embodiments, the invention aims at a board that can readily be used in a DPL process. Such DPL process or Direct Pressure Lamination process is a process in which one or more resin provided paper layers are cured, consolidated and adhered to a board using a heated pressing operation. Preferably, one of said resin provided paper layers is a paper layer having a print. A further one of said resin provided paper layers may be a transparent wear layer applied on top of said print. At the side of the board opposite the print a counterbalancing layer may be applied during the same pressing operation, also including a resin-provided paper layer.

The several independent aspects of the invention, as well as certain preferred embodiments thereof are contained in the claims, and further elucidated here below.

In general, the MOC or MOS boards of the invention, in accordance with any of its aspects here below, may comprise any amount of plant fibers, for example wood fibers, bamboo fibers, straw fibers or any other kind of plant fibers. The amount of plant fibers contained in the board, or any layer thereof, may be as high as 90% or 95% by volume, or as high as 80 or 90% by weight.

Generally speaking, MOC or MOS in itself may have a density from 1600 to 1800 kg per cubic meter.

Generally speaking, the plant fiber may have a density from 600 to 900 kg per cubic meter.

According to a first independent aspect the present invention is a method for manufacturing a coated panel, said panel comprising a board and a decorative layer provided thereon, wherein the board comprises or is obtained from MgO and MgChloride, in other words e.g. a board of so called MOC or magnesiumoxychloride, or wherein the board comprises or is obtained from MgO and MgSulphate, in other words e.g. a board of so-called MOS or magnesiumoxysulphate, said method further having the characteristic that said decorative layer comprises:

a printed paper sheet (decor) being treated with a resin, such as melamine formaldehyde (MF), polyurethane (PU), e.g. water-based PU, latex, acrylate dispersion, thermally curing acrylate resin or unsaturated polyester resin, or a combination thereof, preferably such treated paper has a raw paper weight of 50 to 100 grams per square meter; and/or.

has a resin content of 50 to 130 grams per square meter dry weight; preferably 50 to 100 grams per square meter, when an underlay is used as below, and 80 to 130 grams per square meter, when no underlay is used as below and the printed paper sheet is pressed directly on top of the board; and/or comprises, in particular when such treated paper sheet is intended to form the final upper surface of the panel, i.e. without the overlay paper as below, preferably particles of aluminum oxide e.g. in an amount of 0.1-40 grams per square meter;

and/or a paper sheet (overlay), preferably unfilled, that is transparent or translucent in the obtained panel and applied on top of said printed paper sheet, preferably said paper sheet is being treated with resin, such as melamine formaldehyde (MF), polyurethane (PU), e.g. water-based PU, latex, acrylate dispersion, thermally curing acrylate resin or unsaturated polyester resin, or a combination thereof; preferably such treated paper has a raw paper weight of 8 to 30 or 15 to 35 grams per square meter; and/or has a resin content of 30 to 150 grams per square meter dry weight; preferably 30 to 100 grams per square meter; and/or comprises, preferably particles of aluminum oxide e.g. in an amount of 0.1-40 grams per square meter.

and/or a paper sheet (underlay) applied below the printed paper sheet, and above, preferably directly above, said board, preferably said paper sheet is being treated with resin, such as melamineformaldehyde (MF), polyurethane (PU) e.g. waterbased PU, e.g. waterbased PU, latex, acrylate dispersion, thermally curing acrylate resin or unsaturated polyester resin, or a combination thereof; preferably such treated paper has a raw paper weight of 8 to 30 or 15 to 35 grams per square meter; and/or has a resin content of 20 to 80 grams per square meter dry weight.

Preferably, said particles of aluminum oxide are positioned at the bottom of said overlay, i.e. at the side of the overlay paper sheet facing the printed paper sheet. At the side facing away from said printed paper sheet particles of aluminum oxide may be present as well, preferably having a smaller average particle size. The particles at the bottom side may have an average particle size between 60 and 120 micrometer, while the particles at the top side may have a smaller average particle size, for example smaller than 45 micrometer.

Preferably, said panel further comprises a counterbalancing layer applied to the side of said board which is opposite to where said decorative layer is provided. Preferably said counterbalancing layer comprises:

a paper sheet (preferably comparable to said underlay). Preferably said paper sheet is being treated with resin, such as melamine formaldehyde (MF), polyurethane (PU) e.g. water-based PU, latex, acrylate dispersion, thermally curing acrylate resin or unsaturated polyester resin or a combination thereof. Preferably such treated paper has a raw paper weight of 8 to 30 or 15 to 35 grams per square meter; and/or has a resin content of 20 to 80 grams per square meter dry weight and/or a paper sheet (preferably comparable to said overlay), preferably unfilled, that is transparent or translucent in the obtained panel. Preferably said paper sheet is being treated with resin, such as melamine formaldehyde (MF), polyurethane (PU) e.g. water-based PU, latex, acrylate dispersion, thermally curing acrylate resin or unsaturated polyester resin, or a combination thereof. Preferably such treated paper has a raw paper weight of 8 to 30 or 15 to 35 grams per square meter; and/or has a resin content of 30 to 150 grams per square meter dry weight; preferably 30 to 100 grams per square meter.

According to a preferred embodiment, said panel comprises a single paper sheet as a counterbalancing layer, preferably a paper sheet as defined here above and being comparable to an overlay.

According to another preferred embodiment, the bottom of the board may be free from counterbalancing layers, such as free from PU impregnated paper layers or underlays.

Preferably, said decorative layer is applied to the board by means of a heated press treatment wherein a stack comprising said board, and at least said printed paper sheet treated with resin, and potentially an overlay as defined in said first independent aspect and/or an underlay as defined in said first independent aspect, and/or a counterbalancing layer at the bottom of the board, is brought into a heated press equipment and pressed at a pressure of at least 20 bars, and a temperature of at least 120° C. during at least 10 seconds, wherein a consolidation of the stack is attained together with a partial or full curing of the available resin. In other words a DPL technique is used. According to a preferred embodiment, the stack is pressed for 20 seconds at 50 $kg/cm^2$ and at 195° C.

The first independent aspect leads to a good delamination resistance. The MOC or MOS board is usually porous and absorbs water as well as resin. The above first aspect ensures sufficient resin to enable a resin flow towards and into said board. In so doing, a sufficient adhesion of the decorative layer to the board may be reached.

The board applied in the first independent aspect may be an MgO based board that is made using a wet or using a semi-dry process. In a wet process a slurry comprising at least MgO and MgCl2 or MgSO4 is casted and cured to form a board. In a semi-dry process a particle blend comprising at least MgO and MgCl2 or MgSO4 is pressed and cured to form a board.

The board applied in the first independent aspect may be a symmetrically built-up three layer board or a so-called ABA board, wherein B refers to the central layer, and A to the similarly composed outer layers at each side of the central layer, or a multilayer board e.g. having 5 or more layers. Preferably at least one of said layers, or each of the layers comprises or is based on MOC or MOS.

Preferably, said board contains reinforcement. The reinforcement may be a glass fiber mesh, either woven or non-woven, and/or distributed fibers, for example glass fibers, fibers of polyvinyl alcohol, mineral fibers or cellulose based fibers.

As mentioned above, there are several possible resins that can be applied to any or all of the respective paper sheets. Some of these possibilities are further discussed here below.

According to a first possibility, the resin applied to any or all of the respective paper sheets mentioned in the first independent aspect is a melamine formaldehyde resin. Preferably, the melamine formaldehyde resin is tuned to decrease polycondensation water. This can be obtained by using a melamine to formaldehyde ratio of 1:1.5 or higher (i.e. with less formaldehyde) and/or by curing one or more of the melamine formaldehyde (MF) treated papers prior to the pressing to a degree of crosslinking above 30%, preferably above 50%. The degree of cross-linking is the quantity of impregnated resin which cannot be dissolved from the sample after dipping for 35 minutes in DMF (dimethyl formamide) at room temperature.

Preferably, the printed paper sheet and the resin applied thereto is, within said first possibility, preferably free from antistatic agents, such as free from salts or such, for example free from NaCl or KCl. The absence of salts diminishes the hygroscopic behaviour of the treated printed paper sheet According to a second possibility, the resin applied to one or more of the paper sheets mentioned in the first aspect is polyurethane (PU), latex, an acrylate dispersion, a thermally curing acrylate resin or unsaturated polyester resin or a combination thereof, or a combination of any of these with melamine formaldehyde. With such resins polymer shrinkage in the press can be diminished, such that smaller residual pulling forces in the decorative layer, tending to wrap the pressed whole, are obtained. In this case also less polycondensation moisture is achieved.

According to said second possibility, the resin applied to one or more of the paper sheets mentioned in the first aspect, and in particular at least the resin applied to the printed paper sheet, may be partially thermally curable and partially curable by radiation, e.g. by UV or electron beam. In such case, an additional curing by radiation may be performed prior to or subsequent to the thermal curing, which has for example taken place in the above mentioned heated press treatment.

Printed paper sheets with a thermally curable acrylate or unsaturated polyester resin, for use as a decor paper in coated panels, have for example been disclosed in WO 2020/095196. The resins disclosed in WO'196 may be fully curable by means of a combination (dual cure) of thermal cure and irradiation cure, e.g. with UV. Preferably, such resin is a thermoset (PU)-acrylic, optionally comprising photo-initiators allowing a curing with UV, preferably subsequent to a thermal cure in a heated press.

Using thermally curable acrylate or unsaturated polyester resins or PU on the printed paper sheet and/or overlay, in accordance with said second possibility, brings the advantage that there is less or no polycondensate forming during the curing, for example by means of a heated press treatment. Fewer or no chemical water will be released as compared with the curing of a melamine resin. Due to the absence or minimized presence of chemical water a board can be used, in a method according to the first aspect of the invention, which is dense and/or hydrophobic. Lamination with the one or more papers can be more straightforward. Further the thus treated decor and/or overlay may be less prone to water absorption, and may create a surface with better water sealing properties.

According to a second independent aspect the present invention is a coated panel, preferably obtained or obtainable through a method in accordance with said first aspect of the invention, with the characteristic that said coated panel comprises a board and a decorative layer provided thereon, wherein the board comprises or is obtained from MgO and MgChloride, in other words e.g. a board of so called MOC or magnesiumoxychloride, or wherein the board comprises or is obtained from MgO and MgSulphate, in other words a board of so-called MOS or magnesiumoxysulphate, and wherein said decorative layer comprises at least one, and preferably at least two, of a printed paper sheet, an overlay and an underlay having the features mentioned in said first aspect of the invention.

According to a third independent aspect the present invention is a board, wherein this board comprises or is obtained at least from MgO, or another cement or hydraulically setting material, and a thermosetting resin. Preferably, said thermosetting resin is melamine formaldehyde (MF), ureum formaldehyde (UF) or melamine-ureumformaldehyde (MUF). Adding melamine formaldehyde, ureum formaldehyde, or any other thermosetting resin, preferably aminoplast resin, to an MgO slurry, here referred to as wet process, or MgO dry blend, here referred to as semidry process may lead to an increased compatibility, and potentially increased delamination resistance, of the obtained board with a melamine paper finish. The strength and water resistance of the board may be increased as well. Preferably the resin may still at least partly be cured during a subsequent DPL process in which the melamine finish is applied to said board.

Preferably said thermosetting resin is added to said MgO slurry or MgO dry blend while being in powder and/or dry form. According to an alternative said resin may be added as a water based reins, for example a water based dispersion of MF.

According to a particular embodiment, said board comprises at least three layers and/or is a three layered board, wherein the central layer of said three layers comprises less or no thermosetting resin than the outermost layers at both sides of said central layer which do comprise thermosetting resin. Preferably, such board comprises a cellulose content in said central layer which is larger than in said outermost layers, preferably at least 10 percent by weight larger.

Said layers of said board may further comprise MgO, MgCl2 or MgSO4, mineral fillers for example CaCO3 or perlite, reinforcement for example fibers, woven or non-woven textiles, for example as mentioned in connection with the first aspect.

In accordance with a special embodiment the outermost layer of a board comprising at least three layers, or of a three layered board, may comprise aluminum oxide, for example in order to increase abrasion resistance when combined with a thin decoration layer, such as a thin veneer layer. It is expected that in such case the aluminum oxide may penetrate said thin veneer layer from the bottom and may help protect the veneer from abrasion. Preferably said aluminum oxide is added to the MgO slurry or MgO dry blend in connection to the addition of said thermosetting resin, preferably in powder form.

Preferably, said panel comprises a decorative layer provided thereon, wherein said decorative layer comprises thermosetting resin, such as melamine, and preferably a printed paper sheet and/or an overlay paper and/or an underlay paper. Preferably, said coated panel is obtained through a DPL press treatment.

According to a fourth independent aspect the present invention is a method for manufacturing a board, wherein said board comprises or is obtained from MgO and MgChloride, in other words a board of so called MOC or magnesiumoxychloride, or wherein the board comprises or is obtained from MgO and MgSulphate, in other words a board of so-called MOS or magnesiumoxysulphate, with as a characteristic that said method comprises at least the steps of:

- providing an aminoplast treated substrate, such as an aminoplast impregnated paper sheet or an aminoplast coated textile web, such as a woven or non-woven glass fiber layer;
- providing a slurry of at least MgO and MgChloride, or of at least MgO and MgSulphate on said aminoplast treated substrate; or, alternatively providing particles of at least MgO and MgChloride, or of at least MgO and MgSulphate on said aminoplast treated substrate for example by a scattering operation.

Because said treated substrate is introduced during the MgO board production, a better adhesion is obtained. Subsequently, an increased compatibility with a melamine based DPL process can be obtained. Furthermore, an increased board strength and water resistance may be obtained.

Preferably, said treated substrate does not react or cure during the drying of the MgO board, but rather during the DPL process. Such course of events brings about new possibilities for structuring or embossing the surface of a coated panel comprising such board. A deeper relief or embossing depth may be obtained, wherein the wain in embossing depth is expected to be more or less equal to the thickness of said treated substrate.

Preferably, such a similar or same treated substrate is also applied on top of said slurry or particles. In this manner a board may be obtained comprising at both surfaces an aminoplast treated substrate, such as an aminoplast impregnated paper sheet or an aminoplast coated textile web, such as a woven or non-woven glass fiber layer.

In accordance with a preferred embodiment, a board is obtained having a thickness between 4 and 8 mm, for example about 6 or exactly 6, having a treated substrate at the top and the bottom with a thickness between 0.1 and 0.3 mm, for example about 0.2 or exactly 0.2 mm.

Preferably, the obtained board comprises at least three layers of MgO, or is a three layered board, with the outermost layers having a common composition, which is different to the composition of a central layer, and/or wherein said board shows the properties of boards having at least three layers discussed in connection with the previous aspects.

According to a fifth independent aspect, the present invention is a method for manufacturing a board, whether or not in accordance with the preceding fourth aspect, wherein said board comprises or is obtained from MgO and MgChloride, or in other words e.g. a board of so called MOC or magnesiumoxychloride, or wherein the board comprises or is obtained from MgO and MgSulphate, or in other words e.g. a board of so-called MOS or magnesiumoxysulphate, with as a characteristic that said method comprises at least the steps of:

- providing a slurry of at least MgO and MgChloride, or of at least MgO and MgSulphate, or, alternatively providing particles of at least MgO and MgChloride, or of at least MgO and MgSulphate for example by a scattering operation;
- providing an aminoplast treated substrate, such as an aminoplast impregnated paper sheet or an aminoplast coated textile web, such as a woven or non-woven glass fiber layer, on said slurry or particles, as the case may be.

Clearly, similar advantages may be obtained through the fifth aspect as is the case in the fourth aspect of the invention, and, mutatis mutandis, corresponding preferred embodiments as in the fourth aspect are available in the present fifth aspect of the invention.

As mentioned before, in the context of said fourth and/or fifth aspect, said aminoplast treated substrate is preferably in a stage wherein it can still be cured further.

Preferably, said aminoplast is chosen from the list consisting of melamineformaldehyde resin, ureumformaldehyde resin, phenolformaldehyde resin, melamine-ureum formaldehyde resin.

Preferably, relating to said fourth and/or fifth aspect, said aminoplast treated substrate comprises a paper layer having a raw paper weight of 50 to 100 grams per square meter; and/or a paper layer having a raw paper weight of 100 to 300 grams per square meter, e.g. a so-called Kraft paper, and/or a paper layer having a raw paper weight of 8 to 30 grams per square meter or 15 to 35 grams per square meter, e.g. an overlay.

Clearly, preferably, said slurry is allowed to cure or, alternatively, said powder is allowed to become sintered, in the presence of said aminoplast treated substrate.

According to a sixth independent aspect, the present invention is a method for manufacturing a board, whether or not in accordance with any of fourth or fifth aspect and/or the preferred embodiments thereof, wherein said board comprises or is obtained from MgO and MgChloride, in other words e.g. a board of so called MOC or magnesiumoxychloride, or wherein the board comprises or is obtained from MgO and MgSulphate, in other words e.g. a board of so-called MOS or magnesiumoxysulphate, with as a characteristic that said method comprises at least the steps of:

- providing a slurry of at least MgO and MgChloride, or of at least MgO and MgSulphate, or, alternatively providing particles of at least MgO and MgChloride, or of at least MgO and MgSulphate, potentially on an aminoplast treated substrate, for example by a scattering operation;
- structuring the surface of said slurry or provided, e.g. scattered, particles by means of a mechanical press element;
- at least partially and preferably wholly curing said slurry, or, alternatively sintering said particles, at the same time as structuring or after structuring.

A method wherein particles of MgO are provided, may be referred to as a dry or semidry process of forming MgO based board, be it MOC or MOS.

Clearly, the mechanical press element is preferably structured. The structure of the press element may then be imprinted in the surface of said slurry or scattered particles to form a structured surface on the obtained board.

Preferably, said mechanical press element is structured to provide the surface of said board with a macrostructure, such as with bevels. In the case of HDF based coated panels, the formation of bevels by means of using a structured press element in a melamine finish is e.g. known from WO 2006/066776. Such bevels preferably form lowered edge regions of the finally obtained panels. The bevels or bevelled edges may be straight or curved and provided at one or both edges of an opposite pair of edges, i.e. the long and/or the short pair of edges of a rectangular and oblong panels. In accordance with a variant said mechanical press element may be structured to provide the surface of said board with a macrostructure in the form of a lowered substantially horizontal, edge region, for example allowing the imitation of a groutline.

The thus structured board material, i.e. the slurry or particles, may be cured during 12 to 48 hours, preferably at high relative humidity, e.g. at 75% or more relative humidity.

After partial or complete curing the structured board material may be provided with a decorative finish, for example a paper based finish as in the first aspect of the invention, and/or a melamine based DPL finish. Preferably, said decorative finish is obtained in by means of a heated press operation, for example in a multi or single daylight press. The lamination with a decorative finish may be executed in register with the structure of the board, for example in that the printed pattern comprised on the melamine provided printed paper sheet or decor to be laminated comprises printed features corresponding to structure features in the boards surface, and that the relevant printed features is positioned over the relevant structure feature. By way of example, the printed paper sheet may be applied such that a structure feature provided for imitation of a wood crack is overlaid with a portion of the printed pattern showing such wood crack.

The heated press treatment used for lamination of the decorative finish is preferably applied at a temperature of 80 to 100° C. and a pressure of 50 to 200 bar, for example during 6 to 20 minutes.

It is clear that in the context of sixth aspect of the invention the obtained structured board may comprise one or a plurality of layers, for example at least three layers. In accordance with a preferred embodiment said board comprises at least three layers or is a three layered board as mentioned in connection with any of the previous aspects of the invention.

It is clear that the present invention also concerns a method for manufacturing a coated panel, wherein a board obtained or obtainable through a method in accordance with any of the fourth till sixth aspect is provided with a decorative layer by means of a heated press treatment, for example by means of a DPL process, wherein the decorative layer is preferably a printed paper sheet provided with a thermosetting resin, such as melamineformaldehyde resin.

According to a seventh aspect, the invention is a board, wherein this board comprises at least two layers having a mutually different composition, with as a characteristic that a first layer of said at least two layers comprises or is obtained from at least MgO and MgChloride, while a second layer of said at least wo layers comprises or is obtained from at least MgO and MgSulphate, or wherein this board comprises at least two layers having a mutually different composition, with as a characteristic that a first layer of said at least two layers is based on magnesiumoxychloride, while a second layer of said at least two layers is based on magnesiumoxysulphate.

Textile layers, or other layers, such as paper or cellulose layers, may be at the interface between said two layers. Said textile layers may be woven or non-woven, for example glass fiber layers.

According to a first possible embodiment, said board comprises at least three layers, wherein a layer based on magnesiumoxychloride is adjacent, preferably directly adjacent, i.e. without intermediate layers, or with the intermediate of a textile, paper or cellulose layer, to two layers based on magnesiumoxysulphate, namely one at the bottom and one at the top of the magnesiumoxychloride based layer.

According to a second possible embodiment, said board comprises at least three layers, wherein a layer based on magnesiumoxysulphate is adjacent, preferably directly adjacent, i.e. without intermediate layers, or with the intermediate of a textile, paper or cellulose layer, to two layers based on magnesiumoxychloride, namely one at the bottom and one at the top of the magnesiumoxysulphate based layer.

The combination of MOC and MOS chemistry may bring superior properties to the obtained board, or the coated panel that is manufactured on the basis of such board. MOC has a superior strength compared to MOS, and MOS has a better water resistance than MOC, such that less leaching of chemical constituents will appear in contact with water.

As is the case in said first and second possible embodiment, the board of the seventh aspect preferably comprises at least three layers, or is a three layered board. Preferably, at least a central layer is available, wherein said central layer is a layer based on Magnesiumoxychloride, whereas a more outwardly situated layer, preferably an outermost layer, is based on magnesiumoxysulphate. In this manner the strength of the MOC layer may maximally be taken advantage of.

It is clear that the invention also relates to a coated panel comprising a board in accordance with said seventh independent aspect and/or the preferred embodiments thereof, wherein said panel comprises a decorative layer provided thereon, wherein said decorative layer preferably comprises thermosetting resin, such as melamine, and preferably a printed paper sheet and/or an overlay paper and/or an underlay paper and/or a wood veneer. According to an alternative said panel may comprises one or more of the paper layers mentioned in connection with said first aspect of the invention.

Preferably, said coated panel is obtained through a DPL press treatment.

According to a variant, the invention is a coated panel comprising a board in accordance with said seventh independent aspect of the invention and/or the preferred embodiments thereof, wherein said panel comprises a decorative layer provided thereon, wherein said decorative layer comprises a wood veneer, a ceramic tile, a stone veneer, a thermoplastic top layer, such as a PVC based top layer, preferably comprising a printed pattern.

According to an eighth independent aspect, the invention is a coated panel comprising a board, wherein said board comprises or is obtained from MgO and MgChloride, in other words e.g. a board of so called MOC or magnesiumoxychloride, or wherein the board comprises or is obtained from MgO and MgSulphate, in other words e.g. a board of so-called MOS or magnesiumoxysulphate, or wherein the board is obtained from another mineral or cement material, with as a characteristic that said coated panel comprises a decorative layer formed at or on the surface of said board, wherein said decorative layer comprises a mix of at least an aminoplast resin, stone and/or wood powder, and coloring pigments and/or effect pigments, such as metallic pigments. Preferably, said decorative layer is free from paper layers.

Said stone and/or wood powder may at least comprises particles of aluminum oxide and/or particles of magnesiumoxide and/or particles of magnesiumoxychloride and/or particles of magnesiumoxysulphate.

Said aminoplast resin may comprise or may substantially or essentially consists of melamine formaldehyde resin.

Preferably, said pigments are available in said panel over a thickness of at least 0.1 millimeter, and preferably of at least 0.25 millimeter. Preferably the pigments are available from the top surface upto a depth in said panel of 0.1 millimeter or more, or of 0.25 millimeter or more.

The coated panel of the eighth aspect and/or the preferred embodiments thereof may be used as a mineral tiling product having a solidly colored surface layer, much a like is the case with some durable ceramic tiles. The manufacturing of the coated panels of the eighth aspect however require much less energy and have therefore a much smaller carbon footprint than ceramic tiles.

The present invention also relates to several possible methods ideally suited for manufacturing the coated panel of the eighth aspect of the invention.

The invention namely also is a first possible method for manufacturing a coated panel, wherein this panel preferably shows the characteristics of said eighth aspect and/or the preferred embodiments thereof, with as a characteristic that said method comprises at least the steps of providing a, preferably fully cured, board comprising or obtained from MgO and MgChloride, in other words e.g. a board of so called MOC or magnesiumoxychloride or, comprises or obtained from MgO and MgSulphate, in other words e.g. a board of so-called MOS or magnesiumoxysulphate, or comprising or obtained from another mineral or cement material;

providing a, preferably dry, mix of at least an aminoplast resin, stone and/or wood powder, and coloring pigments and/or effect pigments, such as metallic pigments, on said board;

pressing, preferably hot pressing, said board with the provided thereon mix. Said pressing may be executed similarly as a DPL process, namely with a heated press treatment, wherein said mix replaces the printed paper sheet and/or the overlay.

The invention is also a second possible method for manufacturing a coated panel, wherein this panel preferably shows the characteristics of said eighth independent aspect and/or the preferred embodiments thereof, with as a characteristic that said method comprises at least the steps of providing a slurry or particle blend comprising MgO and MgChloride, in other words e.g. a slurry or particle blend suitable to form so called MOC or magnesiumoxychloride or, comprising MgO and MgSulphate, in other words e.g. a slurry or particle blend suitable to form so-called MOS or magnesiumoxysulphate, or comprising another mineral or cement material, e.g. to form a hydraulically set board material, such as a gypsum fiber board or a Portland cement fiberboard;

providing a, preferably dry, mix of at least an aminoplast resin, stone and/or wood powder, and coloring pigments and/or effect pigments, such as metallic pigments, in, on, or under said slurry or particle blend;

curing said slurry or particle blend in the presence of the provided thereon or therewith mix to form a board.

Preferably, said method further comprises the step of hot pressing the cured board, for example in order to fully cure the aminoplast resin.

According to a preferred embodiment of said second possible method, said slurry is formed by depositing several slurries or particle blends on top of each other, wherein the top or bottom slurry or particle blend comprises said mix. The present preferred embodiment may for example relate to a method of manufacturing a board comprising at least three layers, or a three layered board, wherein said mix is provided in the slurry of one or both of the outermost layers.

Preferably, the first and second possible method are combined with the method of the previously mentioned sixth independent aspect. In this case a structured mechanical press element is used to structure at least the layer comprising said mix.

According to a ninth independent aspect of the present invention, the invention is a board, wherein this board comprises at least one layer that comprises or is obtained from at least MgO and MgChloride, or comprises or is obtained from at least MgO and MgSulphate, with as a characteristic that said layer further comprises thermoplastic material.

Preferably said thermoplastic material is chosen from the list consisting of polypropylene (PP), poly vinyl chloride (PVC), Poly vinyl butyrate (PVB), polyethylene terephthalate (PET), polyethylene (PE) and vinyl acetate/ethylene (VAE).

Preferably said thermoplastic material has a glass transition temperature (Tg) lower than 100° C.

Optionally, the board may further, either in the relevant layer having the thermoplastic material or in another layer, comprise natural filling materials such as wood or bamboo fibers or chips. Thus, the board of the ninth aspect maybe further characterized in that said at least one layer further comprises natural fillers, with particle or fiber form, preferably wood fibers or wood chips, alternatively straw, bamboo, or rice fibers or particles.

With the incorporation of thermoplastic material in the MgO material an improved flexibility and/or water resistance and/or sound absorption may be attained. Further the obtained board may be better compressible and allow for more easy deep embossing. In cases of a floating installation of floor panels comprising such board enhanced sound attenuating may be achieved. Also the incorporation of natural fillers may lead to increased flexibility, especially when such fillers are in fiber form.

Preferably, said board further comprises one or more layers that are free from thermoplastic material and/or comprise less thermoplastic material than said layer, as expressed in weight percentage, for example at least less than half, or at least 10 wt % less.

Preferably, said at least one layer comprising thermoplastic material is centrally located between two layers that comprise or are obtained from at least MgO and MgChloride, or comprise or are obtained from at least MgO and MgSulphate, but comprise less or no thermoplastic material, as expressed in weight percentage, for example at least less than half, or at least 10 wt % less.

Preferably, said board comprises at least two layers that comprise or are obtained from at least MgO and MgChloride, or comprise or are obtained from at least MgO and MgSulphate, and comprising thermoplastic material, wherein said two layers are separated by a central layer that comprises or is obtained from at least MgO and MgChloride, or comprises or is obtained from at least MgO and MgSulphate, but comprises less or no thermoplastic material than any of said two layers, as expressed in weight percentage, for example at least less than half, or at least 10 wt % less.

The invention also relates to a method which is ideally suited for forming the boards of the ninth independent aspect. Therefor the invention is also a method for manufacturing a board, wherein said board comprises at least one layer that comprises or is obtained from at least MgO and MgChloride, or comprises or is obtained from at least MgO and MgSulphate, with as a characteristic that said method comprises the steps of providing an MgO dry blend, e.g. comprising at least MgO and, MgChloride and/or MgSulphate, wherein said dry blend further comprises thermoplastic particles;

preferably pressing said dry blend.

The thermoplastic material that is added to the dry blend may melt during said pressing, or during a subsequent heated press treatment, such as while providing the obtained board with a decorative layer, e.g. in a DPL process.

It is furthermore clear that the present invention also relates to a method for manufacturing a coated panel, wherein a board in accordance with the ninth aspect or a board obtained through the above method ideally suited for manufacturing such board, is provided with a decorative layer by means of a heated press treatment, preferably a DPL process. Preferably, said decorative layer comprises thermosetting resin, such as melamine, and preferably a printed paper sheet and/or an overlay paper and/or an underlay paper and/or a wood veneer. According to a variant, the invention relates to a method for manufacturing a coated panel and a coated panel obtained or obtainable thereby, wherein a board in accordance with the ninth aspect or a board obtained through the above method ideally suited for manufacturing such board, wherein said board is provided with a decorative layer, wherein said decorative layer comprises a wood veneer, a ceramic tile, a stone veneer, a thermoplastic top layer, such as a PVC based top layer, preferably comprising a printed pattern.

According to a tenth independent aspect, the present invention is a method for manufacturing a board, wherein said method comprises at least:

the step of providing a slurry comprising MgO and MgChloride, in other words e.g. a slurry suitable to form so called MOC or magnesiumoxychloride or, comprising MgO and MgSulphate, in other words e.g. a slurry suitable to form so-called MOS or magnesiumoxysulphate, or comprising another mineral or cement material, e.g. to form a hydraulically set board material, such as a gypsum fiber board or a Portland cement fiberboard;

the step of extruding said slurry through a die; said step of extruding preferably being a continuous operation;

the step of curing the extruded slurry.

The step of curing may be performed similarly as is the case for boards produced in the wet or semi-dry production process, explained in the context of the preceding aspects. Preferably, said step of curing the extruded slurry is performed for 6 to 48 hours at 30 to 60° C. and in a relative humidity of 50 to 80%.

Preferably, said slurry comprises flowing agents and/or rheologically active agents and/or an additive chosen from the list consisting of carboxymethylcellulose, xanthan gum and polymer acrylamide, preferably in an amount of 3% by weight or less.

Preferably, said slurry comprises cellulose in an amount of preferably 5 to 40% by weight.

Preferably, said slurry comprises fillers, such as perlite and/or calciumcarbonate, in an amount of preferably 5 to 40% by weight.

Preferably, said slurry comprises reinforcing fibers, such as glass fibers, mineral fibers, polyvinyl alcohol fibers, in an amount of 1 to 10% by weight.

According to the most preferred embodiment, said slurry or paste to be extruded comprises the following composition:

MgO— MgCl2-H20 in a 5-1-13 mol ratio or MgO—MgSO4-H2O, preferably in a 9-1-21, 9-1-20 or 5-1-12 mol ratio;

0 or 0.1 to 3% by weight of rheologically active agents and/or an additive chosen from the list consisting of carboxymethylcellulose, xanthan gum and polymer acrylamide;

optionally 5 to 40 wt % of cellulose, preferably wood cellulose;

optionally 5-40 wt % of fillers, preferably perlite or another carbonate based material;

optionally 1 to 10 wt % of reinforcement, preferably glass fibers, polyvinyl alcohol (PVA) fibers or mineral fibers.

The obtained board may have a single layer obtained from a uniform or quasi uniform composition, for example the composition of the above most preferred embodiment. According to an alternative the obtained board may have a plurality of layers, for example at least three, or be a three layered board, having at least two layers obtained from a different composition. Preferably said at least two layers, and even better all layers of the board, are obtained by extruding their respective slurry through a respective or common die. The difference in composition between said at least two layers may be in accordance with the multilayered board disclosed in connection with the other aspects of the invention and/or may at least comprise a difference in the wt % of cellulose, filler and/or reinforcement contained therein.

According to a first preferred embodiment of said tenth aspect, said slurry is extruded on top of a board material, and adhered thereto. An MgO based material, such as a wood-MgO-composite, may be extruded on top of a board material in accordance with the present first preferred embodiment. Said board material may be a board comprising or based on MOC and/or MOS, a Portland cement fiber board, a gypsum fiber board, a ceramic board material, such as a single or double fired ceramic body, terracotta or porcelain, a plastic or plastic composite panel, or a wood-based panel, such as MDF or HDF or a wood-plastic composite.

According to a second preferred embodiment, said slurry is extruded on a removable support, and after dividing, forms a board or self-supporting layer for example having a length of 0.8 to 3 m and a width of 0.1 to 0.5 m. Said removable support may comprise a structured surface or a structured element may be available between said removable support and said slurry. In such case, a structured surface can be formed in the respective surface of a board obtained from such slurry. Said structured surface may comprise grooves extending in direction of said extruding, such as grooves that in the finally obtained panel lead to lowered edge regions, for example in the form of bevelled edges or groutline imititations, at one or more edges of a pair of opposite sides. Such lowered edge regions may further show the features discussed in the context of the above mentioned sixth independent aspect of the present invention.

As the extrusion process may be continuous one or more steps of such a method may be performed continuously on the same line. The method of said tenth independent aspect may for example further comprise the step of texturing the extruded slurry, e.g. by means of an embossing roller, preferably in line with the extrusion.

The possibility of extruding the slurry, in accordance with the tenth aspect and/or the preferred embodiments thereof, may lead to a continuous production process and/or an increased output.

According to an eleventh independent aspect, the present invention is a board, with as a characteristic that said board at least comprises a thermally insulating material, centrally located between a top and/or bottom layer that comprises or is obtained from at least MgO and MgChloride, or comprises or is obtained from at least MgO and MgSulphate, or comprises or is obtained from another mineral material or cement material. Said top and/or bottom layer may form a barrier against fire.

Said thermally insulating material may be or may comprise a, preferably foamed, material, such as EPS (expanded polystyrene) or XPS (extruded polystyrene), PU (Polyurethane), PIR (polyisocyanurate), phenol.

Said thermally insulating material may be or may comprise a fibrous material, such as glass wool or rock wool. In this case an enhanced fire resistance may be obtained.

Preferably, said top and bottom layer are significantly thinner than said centrally located thermally insulation material, in other words said top and bottom layer may form a skin of the board of the eleventh aspect.

Preferably the board of the eleventh aspect is a structural insulated panel or SIP.

For the top and bottom layer any of the compositions of MOC or MOS mentioned in connection with any of the aspects of the present invention may be applied, each having its own properties and advantages as mentioned in that respect.

In accordance with a twelfth independent aspect, the present invention is a method of manufacturing a board, wherein said board comprises or is obtained from MgO and MgChloride, in other words e.g. a board of so called MOC or magnesiumoxychloride or wherein the board comprises or is obtained from MgO and MgSulphate, in other words e.g. a board of so-called MOS or magnesiumoxysulphate, with as a characteristic that said method comprises at least the steps of:

providing a structured element;

depositing on said structured element a powder or a slurry comprising MgO and MgChloride, preferably a powder or a slurry suitable to form so called MOC or magnesiumoxychloride, or, comprising MgO and MgSulphate, preferably a powder or a slurry suitable to form so-called MOS or magnesiumoxysulphate, or comprising another mineral or cement material, e.g. to form a hydraulically set board material, such as a gypsum fiber board or a Portland cement fiberboard;

solidifying said slurry or powder, e.g. by curing (preferably by heating or drying) and/or sintering and/or by pressing.

A cured mineral board having an embossed or structured surface can be obtained.

In the method of the twelfth aspect, the first poured or deposited layer is preferably the top layer of the board. When an embossment is desired at the bottom of the board, an additional press element can be used on top of the finally poured or deposited layer.

The obtained board can for example be further finished by means of a print, such as a digital print. Preferably, the print is provided at the embossed surface of said board. The print may further be finished using one or more lacquer layers, potentially comprising aluminum oxide. The lacquers may be UV or electron beam curable.

According to a special embodiment, said method further includes the step of providing a, preferably white, paper layer or other base layer, preferably a printing base paper having a Gurley value (Tappi T460) of 25 seconds or below, on said structure element, wherein said powder or slurry is deposited on said structured element with the intermediate of said paper or base layer. Preferably said paper or base layer is adhered to said slurry upon solidification thereof. Preferably said paper at its surface facing outwardly comprises an inkjet-receiving coating, for example comprising at least polyvinyl alcohol and silica pigments.

It is clear that the present invention also relates to a method of manufacturing a coated panel, with as a characteristic that a board obtained or obtainable through the method of said twelfth independent aspect and/or the preferred embodiments thereof is provided with a, preferably digital, print on the structured surface thereof.

The use of a paper for creating a board with enhanced decoration or printing capabilities is of interest independently form any structure applied to the board. Also alternatives for paper can be used to create enhanced decoration capabilities. Therefore the present invention also is a board, wherein this board comprises at least one layer that comprises or is obtained from at least MgO and MgChloride, or comprises or is obtained from at least MgO and MgSulphate, with as a characteristic that said board at a surface thereof comprises Titaniumoxide and/or is white. According to a variant other pigments or colors may be employed. For example a yellowish or beige color obtained through a respective pigment may be beneficial for applying a darker wood print, in that more vivid colors can be obtained through a minimized ink usage for such type of wood print due to the carefully selected background color.

Preferably, said board is further characterized in that at said surface it comprises a paper layer filled with titaniumoxide, or in that said surface is coated with a primer layer, or in that said at least one layer further comprises titaniumoxide and is present at said surface.

According to a special embodiment, said board comprises multiple layers or is for example a three layered board, wherein at least one of the outermost layers is an MgO based layer, for example MOC or MOS based, and comprises said titaniumoxide.

In accordance with a thirteenth independent aspect of the invention, it is a board, with as a characteristic that said board comprises or is obtained from at least MgO and MgChloride, or comprises or is obtained from at least MgO and MgSulphate, and in that said board further comprises rock wool fibers.

The invention in accordance with said thirteenth aspect provides a board presenting a trade-off between the advantageous properties of the more expensive rockwool fiber, and the more economic nature of the mineral, i.e. MOS or MOC, material.

According to a first preferred embodiment, said rockwool fibers are at least available as being randomly distributed in a layer comprising or obtained from MgO and MgChloride, or comprising or obtained from at least MgO and MgSulphate. The rockwool fiber may act as a reinforcement of the mineral board, that at the same time provides flexibility, for example enhancing some features of potential coupling parts at the edges of the board, which will further be discussed below.

According to a second preferred embodiment, said rockwool fibers are at least available in a layer of said board which is substantially free from MgO, MgChloride and MgSulphate. Said layer preferably forming a surface of said board. Preferably said layer has a density of 800 kg per cubic meter or more, and essentially comprises rockwool fibers bound by means of a glue, for example an aminoplast glue, such as ureumformaldehyde, melamineformaldehyde or phenolformaldehyde or mixtures thereof, or a glucose based glue, such as the glue described in U.S. Pat. No. 7,947,765 B2.

A board having an outermost or top layer comprising rockwool fibers provides for an enhanced adhesion with a melamine based decorative layer, such as a decorative layer provided by means of a DPL process. Preferably one or more of the paper sheets of the above mentioned first independent aspect are applied. Furthermore, the layer comprising the rockwool fibers may be somewhat deformable and may enhance forming of deep relief features by means of embossing, for example in one and the same press treatment of the DPL process for adhering and curing a melamine and paper based decorative layer.

The use of multiple layers of different mineral materials is also advantageous for other board materials. Therefore it is clear that the invention also is a board, with as a characteristic that said board comprises at least two layers, namely a first layer that comprises or is obtained from at least MgO and MgChloride, or comprises or is obtained from at least MgO and MgSulphate, and a second layer that comprises or is obtained from a different mineral material.

Said second layer comprising or obtained from a different mineral material may be a layer essentially comprising glued rockwool fibers, a layer essentially comprising set Portland cement, a layer being a gypsum fiber board, a layer comprising silica, e.g. a board made basically from silica, or a layer essentially comprising concrete, preferably ultra high performance concrete (UHPC).

Ultra-High Performance Concrete (UHPC) is a cementitious, concrete material. It preferably has a minimum specified compressive strength of 17,000 pounds per square inch (120 MPa). Fibers may be included in the UHPC mixture. Ultra-High Performance Concrete (UHPC), is also known as reactive powder concrete (RPC). The material is typically formulated by combining Portland cement, supplementary cementitious materials, reactive powders, limestone and or quartz flour, fine sand, high-range water reducers, and water.

The material can be formulated to provide compressive strengths in excess of 200 MPa. The use of fine materials for the matrix also provides a dense, smooth surface valued for its aesthetics and ability to closely transfer form details to the hardened surface. When combined with metal, synthetic or organic fibers it can achieve flexural strengths up to 48 MPa or greater. Fiber types often used in UHPC include high carbon steel, PVA, Glass, Carbon or a combination of these types or others.

In the case concrete and/or UHPC is used as a top or outermost layer of the board, such board may be used per se as a decorative element, for example a flooring element, having an industrial look. Preferably, in such case, the board is produced using the abovementioned wet method Preferably, said board comprises multiple layers and has a symmetrical buildup, preferably at least in that the top and bottom layer of the board comprise or are obtained from said different mineral material, e.g. concrete, with these top and bottom layers being distanced by one or more, preferably an odd number of, layers that comprise or are obtained from at least MgO and MgChloride, or comprise or are obtained from at least MgO and MgSulphate. In this manner a stable sandwich material can be obtained, wherein for example cupping can be minimized.

Preferably, a board having multiple layers of different mineral materials is manufactured by serial depositing of slurries having the respective mineral material composition. Preferably, thus, a wet production method is preferred.

In accordance with a preferred embodiment, said board is manufactured as follows:

- optionally depositing a first slurry;
- depositing a first MgO containing slurry, for example a slurry suitable to form MOC or MOS composition;
- depositing a second MgO containing slurry, for example a slurry suitable to form MOC or MOS composition, wherein said second MgO slurry is different from said first MgO based slurry;
- depositing a third MgO containing slurry, for example a slurry suitable to form MOC or MOS composition, said third MgO containing slurry preferably being substantially the same, or being the same as said first MgO based slurry;
- depositing a final slurry comprising a mineral material different from said MgO, and being preferably free, or substantially free from MgO. It is clear that the layer formed on the basis of said final slurry is preferably suitable for forming a layer essentially comprising glued rockwool fibers, a layer essentially comprising set Portland cement, a layer being a gypsum fiber board, a layer comprising silica, e.g. a board made basically from silica, or a layer essentially comprising concrete, preferably ultra high performance concrete (UHPC). Preferably, said first slurry, when available, is substantially the same, or the same as said final slurry. In this manner, a higher stability of the sandwich material can be obtained.

Said steps of depositing may be carried out on a conveyor means, such as on a conveyor belt, having depositing stations, e.g. pouring stations, for the respective slurries along the trajectory of said conveyor means.

Preferably said slurries are solidified or cured in a common operation. According to a variant one or more of the deposited slurries may be partially or wholly solidified or cured prior to depositing a subsequent slurry. For example, the MgO containing slurries may be partially cured, preferably in a common operation, before said final slurry is deposited.

According to a fourteenth independent aspect, the present invention is a board, with as a characteristic that said board comprises at least one layer of glued together natural fibres, wherein the natural fibers are coconut and/or flax fibers, and wherein the glue is preferably obtained from soybeans. Preferably said board essentially comprises or consists of said glued together natural fibers.

Preferably the board of said fourteenth aspect further comprises wood fibers, preferably in said layer comprising said coconut and/or flax fibers.

The inventors found that coconut fibers and flax fibers may be used as reinforcement in a board.

According to a fifteenth independent aspect, the present invention is a method for manufacturing a board, wherein said board comprises or is obtained from MgO and MgChloride, in other words e.g. a board of so called MOC or magnesiumoxychloride, or wherein the board comprises or is obtained from MgO and MgSulphate, in other words e.g. a board of so-called MOS or magnesiumoxysulphate, with as a characteristic that said method comprises at least the steps of:

- depositing or extruding a powder or a slurry comprising MgO and MgChloride, e.g. a powder or a slurry suitable to form so called MOC or magnesiumoxychloride or, comprising MgO and MgSulphate, e.g. a powder or a slurry suitable to form so-called MOS or magnesiumoxysulphate, or comprising another mineral or cement material, e.g. to form a hydraulically set board material, such as a gypsum fiber board or a Portland cement fiberboard);
- forming profiles to one or more edges of the deposited or extruded material.

Said profiles preferably comprise mechanical coupling means.

Preferably profiles are formed at at least two opposite edges, wherein said profiles are complementary to each other, preferably in that, in coupled condition of said profiles, at least a locking is obtained in a direction perpendicular to the plane of coupled panels and/or in a direction perpendicular to the edges and in the plane of the panels. Said forming of profiles is preferably executed while the powder or slurry has not been completely cured, so preferably prior to a step of solidifying said slurry or powder, e.g. by curing (by heating or drying) and/or sintering and/or by pressing. According to a variant, a further forming operation, for example by means of rotating cutting tools, is used after said step of solidifying in order to complete the contour of the respective mechanical coupling means.

Said profiles, e.g. comprising mechanical coupling means, may be free from undercuts or free from contour portions which are vertically underneath the top and bottom surface of said board, at least initially upon being formed by means of said one or more shaped elements. It is not excluded that such undercuts or contour portions may be formed at any time after said forming by means of the one or more shaped elements, for example after curing the shaped slurry or powder.

Said forming can be done by means of one or more shaped elements indenting the uncured or semi-cured slurry or powder, or by means of the extrusion die, when available, or by gradually transforming the slurry or powder as it moves continuously passed a shaped mold. Preferably at least two shaped elements are applied, one at the bottom and one at the top of said slurry or powder. With such operation indeed the profiles are preferably free from undercuts. Potential undercuts may be provided in in a further forming operation before or after partly or wholly solidifying the deposited material, for example by means of rotating milling tools.

It is clear that the slurry or powder may show the features of the slurries and powders disclosed in connection with any or the other disclosed aspects of the invention. In particular, in case of extrusion, the slurry disclosed in connection with the tenth independent aspect of the invention may be applied.

It is further clear that the obtained board may comprise a single layer, or at least three layers, or be a three layered board, as disclosed in any of the aspects of the invention.

According to a sixteenth independent aspect, the present invention is a method for manufacturing a board, wherein said board comprises or is obtained from MgO and MgChloride, in other words e.g. a board of so called MOC or magnesiumoxychloride, or wherein the board comprises or is obtained from MgO and MgSulphate, in other words e.g. a board of so-called MOS or magnesiumoxysulphate, with as a characteristic that said method comprises at least the steps of:

- depositing or extruding a powder or a slurry comprising MgO and MgChloride, e.g. a powder or a slurry suitable to form so called MOC or magnesiumoxychloride or, comprising MgO and MgSulphate, e.g. a powder or a slurry suitable to form so-called MOS or magnesiumoxysulphate, or comprising another mineral or cement material, e.g. to form a hydraulically set board material, such as a gypsum fiber board or a Portland cement fiberboard;
- compressing the powder or slurry; preferably by means of one or more twin belt presses; potentially one or more heated twin belt presses;
- solidifying said slurry or powder, e.g. by curing (by heating or drying) and/or sintering and/or by pressing.

Said solidifying may be partly or wholly simultaneous to said compressing, or at least partially or wholly subsequent thereto.

Preferably, said step of depositing is repeated, e.g. executed two or more times, with a compressing step in between. In accordance with this preferred embodiment a multilayered board can be formed. In accordance with a variant it is also possible that the material, i.e. the powder or slurry, for two or more layers is commonly compressed, namely without intermediate compressing step between the step of depositing said layers.

By compressing the powder, preferably by means of one or more twin belt presses, a more dense board may be obtained, for example a board having a density of 1000 kg per cubic meter or more. Preferably the board or layer composed of said compressed slurry or powder has said density.

In accordance with a preferred embodiment, said board is manufactured as follows:

- depositing a first MgO containing slurry or powder blend, for example a slurry or powder blend suitable to form MOC or MOS composition;
- depositing a second MgO containing slurry or powder blend, for example a slurry or powder blend suitable to form MOC or MOS composition, wherein said second MgO slurry is different from said first MgO based slurry;
- depositing a third MgO containing slurry or powder blend, for example a slurry or powder blend suitable to form MOC or MOS composition, said third MgO containing slurry preferably being substantially the same, or being the same as said first MgO based slurry;
- compressing said first, second and third MgO containing slurry or powder blends simultaneously by means of one or more, preferably heated, twin belt presses.

In accordance with the present preferred embodiment a board having at least three layers is obtained, preferably a three layer board. It is clear that the respective slurries or powder blends may have the same compositions as those mentioned in connection with the other aspects of the present invention, in particular as those mentioned in connection with multilayered boards.

According to an independent seventeenth aspect, the present invention is a board, with as a characteristic that this board is a board comprising 5Mg(OH2)·MgSO4·7H2O.

To obtain a board with the characteristics of the seventeenth aspects it can be started from a mix having a molar ratio MgO—MgSO4-H20 of 5-1-12 and/or 5-1-14 and/or 9-1-21.

Preferably said board is single layered, comprises at least three layers, or is a three layered, or multilayered board.

Preferably, said board comprises at least one layer based on MgO and MgSulphate, e.g. a layer or a board of so-called MOS or magnesiumoxysulphate.

It is clear that the present invention also concerns a method that is ideally suitable for manufacturing a board in accordance with said seventeenth aspect. Therefor the invention is a method of manufacturing board, whether or not having the characteristics of said seventeenth aspect, wherein said method comprises the step of providing a mixture of at least MgO, MgSulphate and one or more of citric acid, sodium citrate and phosphoric acid. Said mixture of MgO and MgSulphate is preferably a water based mixture in accordance with the following molar ratio: MgO—MgSO4-H20 of 5-1-12 and/or 5-1-14 and/or 9-1-21.

The inventors have found that the microstructure of the obtained MgO material may become more homogenous and dense due to interlaced needle and bundled shape crystals. In particular when citric acid or phosphoric acid is used in MOS, the obtained material may become more compact and may have a higher strength.

Preferably said one or more of citric acid, sodium citrate and phosphoric acid is added in amount of 0.2-3% (wt % of MgO), ie 0.2 to 3 weight parts per 100 weight parts of MgO. Further such mixture may comprise alkali resistant binders and/or separate fibers and/or one or more reinforcement textiles, such as glass fiber layers, woven or non-woven. Said alkali resistant binders may be chosen from the list consisting of latex, acrylic, polyurethane, polyvinylalchohol (PVA), ethylene vinylacetate (EVA), PVAc dispersion, acylic styrene emulsion, silicate glue, solvent based one component or two component resin, silane and siloxanes. Said separate fibers may be glass fibers or others, such as PVA fibers or cellulose fibers.

Said mixture of MgO and MgSulphate is preferably a water based mixture in accordance with the following molar ratio: MgO—MgSO4-H20 of 5-1-12 and/or 5-1-14 and/or 9-1-21. An antifoaming agent may or may not be added to the respective slurries. With the 5-1-12 molar ratio, a viscous slurry was obtained, with a minimized risk of or no phase separation. With the 5-1-14 molar ratio a viscous liquid was obtained. Granule formation could be observed during mixing to some extent. A glitterish surface was formed after 40 hours of curing in the cases where no antifoaming agent had been used. With the 9-1-21 molar ratio a less viscous liquid was obtained and less granule forming was noticed. Within a matter of minutes after depositing or pouring the liquid in a mold a clear phase separation was witnessed.

After 40 hours of curing it appeared that the molar ratio 5-1-14 without antifoaming agent led to the strongest MgO material. It was further noticed that any of the molar ratios without antifoaming agent had a dryer feeling after 40 hours of curing.

It is further that the present invention also concerns a further method that is ideally suitable for manufacturing a board in accordance with said seventeenth aspect. Therefore the invention is also a method for manufacturing board, whether or not in accordance with said seventeenth aspect of the here above disclosed ideally suited method for manufacturing such board, characterized in that said method comprises the step of providing a mixture of, or of at least, 35 to 50 wt % of MgO, preferably having a purity of 80-98% (wt %)

50 to 65 wt % of MgSO4 in a 20-40% (wt %) solution in water;

the step of solidifying said mixture.

In accordance with a preferred embodiment said mixture is provided, wherein said mixture comprises, or at least comprises 37.93 to 47.63 wt % of MgO, preferably having a purity of 80-98% (wt %)

52.37 to 62.07 wt % of MgSO4 in a 24.16-35.79% (wt %) solution in water;

Here below some preferred mixtures for the manufacturing of boards comprising MOS are provided.

Example 1: MgO—MgSO4-H2O Molar Ratio 5-1-12, 98% Pure

| Material | Mol | g/mol | Weight (g) | wt % | Purity(%) |
|---|---|---|---|---|---|
| MgO | 5 | 40.3 | 205.61 | 37.93% | 98 |
| MgSO4 | 1 | 120.4 | 120.4 | 22.21% | |
| H2O | 12 | 18 | 216 | 39.85% | |
| Sum | | | 542.01 | 100.00% | |
| Watery MgSO4 solution | | | 336.4 | 62.07% | wt % of MgSO4 in water: 35.79% |

Example 2: MgO—MgSO4-H2O Molar Ratio 5-1-12, 80% Pure

| Material | Mol | g/mol | Weight (g) | wt % | Purity(%) |
|---|---|---|---|---|---|
| MgO | 5 | 40.3 | 251.88 | 42.82% | 80% |
| MgSO4 | 1 | 120.4 | 120.4 | 20.47% | |
| H2O | 12 | 18 | 216 | 36.72% | |
| Sum | | | 588.28 | 100.00% | |
| Watery MgSO4 solution | | | 336.4 | 57.18% | wt % of MgSO4 in water: 35.79% |

Example 3: MgO—MgSO4-H2O Molar Ratio 9-1-21, 98% Pure

| Material | Mol | g/mol | Weight (g) | wt % | Purity(%) |
|---|---|---|---|---|---|
| MgO | 9 | 40.3 | 370.1 | 42.61% | 98% |
| MgSO4 | 1 | 120.4 | 120.4 | 13.86% | |
| H2O | 21 | 18 | 378 | 43.52% | |
| Sum | | | 868.5 | 100.00% | |
| Watery MgSO4 solution | | | 498.4 | 57.39% | wt % of MgSO4 in water: 24.16% |

Example 4: MgO—MgSO4-H2O Molar Ratio 9-1-21, 80% Pure

| Material | Mol | g/mol | Weight (g) | wt % | Purity(%) |
|---|---|---|---|---|---|
| MgO | 9 | 40.3 | 453.38 | 47.63% | 80% |
| MgSO4 | 1 | 120.4 | 120.4 | 12.65 | |
| H2O | 21 | 18 | 378 | 39.72% | |
| Sum | | | 951.78 | 100.00% | |
| Watery MgSO4 solution | | | 498.4 | 52.37% | wt % of MgSO4 in water: 24.16% |

In general, it is clear that the present invention also concerns a floor, wall or ceiling panel comprising a board in accordance with, or obtained through any of the preceding independent aspects or methods and a provided thereon decorative top layer, and/or being a coated panel as described in any of the preceding aspects.

Preferably, the board is provided at at least two opposite edges with coupling means allowing to couple two such panels at the respective edges, wherein a vertical locking perpendicular to the plane of coupled panels and/or a horizontal locking perpendicular to the respective edges and in the plane of the coupled panels is obtained.

The coupling means may be basically shaped as a tongue and a groove, wherein the groove is bordered by an upper and a lower lip. Preferably, said lower lip and/or said upper lip comprises a locking element taking part in said horizontal locking, wherein the respective lip is preferably at least partially provided in a layer of the board that comprises cellulose fibers and/or magnesiumoxychloride.

Preferably, said board comprises at least three layers, namely a centrally located layer and two more outwardly situated layers at each side of the central layer, wherein the more outwardly situated layers comprises a higher cellulose content than the central layer, that may, in accordance with a particular embodiment, comprise no cellulose at all, and wherein the respective lip is provided at least partially, and potentially essentially or wholly in the outwardly situated layer situated at the bottom of said central layer.

Preferably, said coupling means or coupling parts further show characteristics as disclosed in WO '97/47834.

Preferably, said coupling parts are provided at least at the edges of two opposite sides of a panel, wherein said coupling parts cooperate which each other and are substantially in the form of a tongue and a groove, wherein said coupling parts are provided with integrated mechanical locking means which prevent the drifting apart of two coupled floor panels into a direction perpendicular to the related edges and parallel to the underside of the coupled panels, e.g. floor panels. Preferably, the coupling parts are provided with means, which are formed more particularly by the aforementioned locking means, which, in the engaged condition of two or more of such panels exert a tension force upon each other which forces the panels towards each other.

Preferably, at least one of the coupling parts has an elastically bendable portion which, in the engaged condition, is at least partially bent and in this manner provides the aforementioned tension force. Preferably, the elastically bendable portion consists of a lip, preferably the lip limiting the lower side of the aforementioned groove. Said bendable portion may be provided with a contact surface which inwardly slopes downward.

Preferably, the coupling parts and the locking means are realized in one piece with the core of the panels, e.g. floor panels.

Preferably, the panels show the following combination of characteristics: that the coupling parts and locking means are realized in one piece with the core of the panels, e.g. floor panels; that the coupling parts have such a shape that two subsequent floor panels can be engaged into each other exclusively by snapping together and/or turning, whereby each subsequent floor panel can be inserted laterally into the previous; that the coupling parts provide in an interlocking, free from play, according to all directions in the plane which is situated perpendicular to the aforementioned edges; that the possible difference between the upper and lower lip of the lips which border the aforementioned groove, measured in the plane of the panel and perpendicular to the longitudinal direction of the groove, is smaller than one time the total thickness of the panel; that the total thickness of each related panel is larger than or equal to 5 mm; and that the basic material of the panels, of which the aforementioned core and the locking means are formed, consists of a board obtained through any of the methods or aspects of the present invention, preferably a board based on MgO and MgChloride, in other words a board of so called MOC or magnesiumoxychloride, or, preferably a board that is based on MgO and MgSulphate, in other words a board of so-called MOS or magnesiumoxysulphate.

In a preferred embodiment of any of the aspects of the invention, at least the part of the potential tongue protruding beyond the upper edge and/or the cooperating therewith part of the groove is entirely realized in a layer or board that is based on magnesiumoxychloride. As is explained above, in connection e.g. with the seventh aspect, magnesiumoxychloride has a higher strength than magnesiumoxychloride. A stronger locking in the vertical direction can be obtained in this way.

In another preferred embodiment, which may be combined with the above preferred embodiment, the groove is bordered by an upper lip and a lower lip, with the lower lip comprising a locking element taking part in the locking in a horizontal direction. The lower lip is provided at least partially in a layer of the board or in a board that comprises cellulose fibers. Preferably, at least half of the thickness of the lower lip at its thinnest zone is formed by said cellulose containing layer or board. The presence of cellulose enhance the flexibility of the lower groove lip. Preferably said cellulose containing layer or board is based magnesiumoxysulphate.

It is noted that the above mentioned aspects and methods may be combined in as far as they are not contradicting each other.

BRIEF DESCRIPTION OF THE DRAWINGS

With the intention of better showing the characteristics according to the invention, in the following, as an example without limitative character, some embodiments are described, with reference to the accompanying drawings, wherein.

DETAILED DESCRIPTION OF VARIOUS EMBODIMENTS

Figure 1:
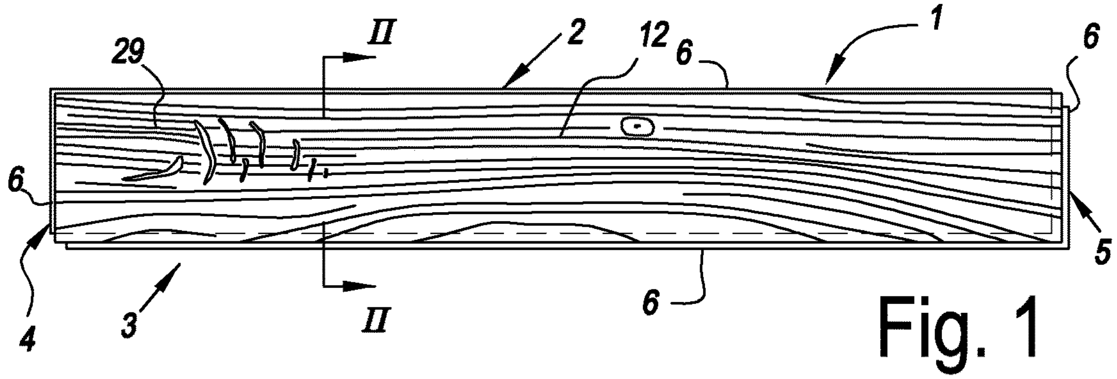
FIG. 1, in perspective, shows a floor panel in accordance with the invention.

FIG. 1 illustrates a panel 1 in accordance with amongst others the first aspect of the invention. In this case it is a floor panel 1 that is oblong and rectangular and comprises a long pair of opposite edges 2-3 and a short pair of opposite edges 4-5, both provided with coupling parts 6 allowing to couple two such panels at the respective edges 2-3; 4-5.

Figure 2:
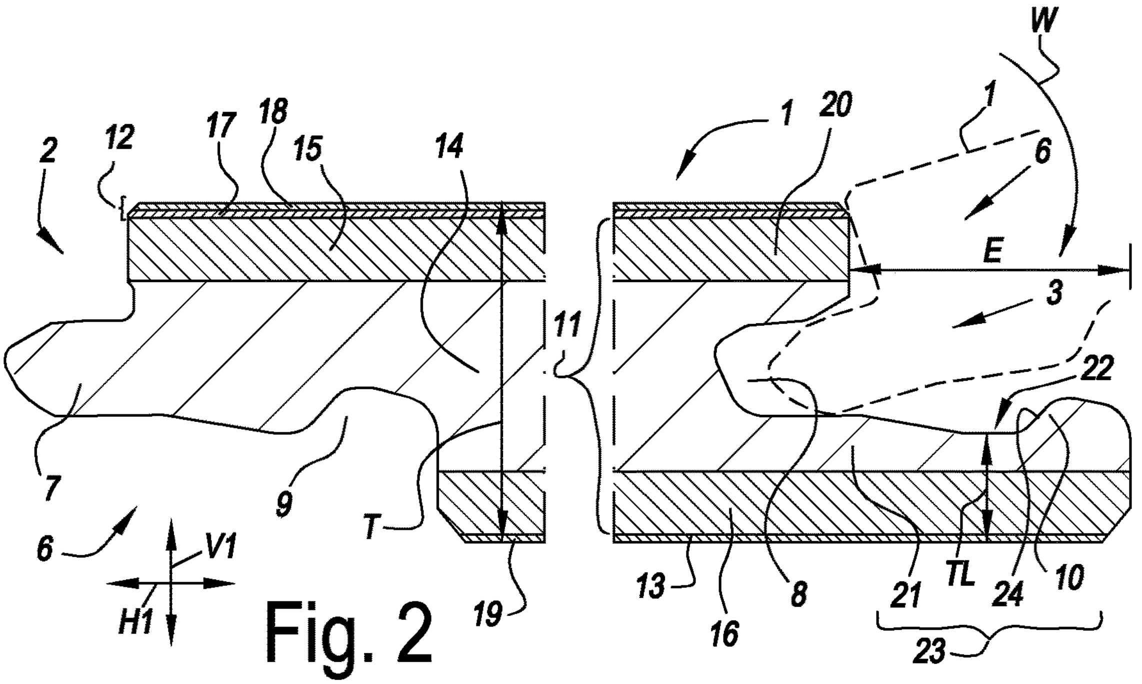
FIG. 2 at larger scale shows a cross-section according to the line II-II on FIG. 1.

FIG. 2 shows that the coupling parts 6 at least on the long pair of opposite edges 2-3 are basically shaped as a tongue 7 and a groove 8 provided with locking elements 9-10 preventing the moving apart of the tongue and groove connection. These coupling parts 6 are realized in one piece with the core or board 11 of the floor panels 1. The cooperation of the coupling parts 6 results in two such panels 1 to become interlocked, wherein a vertical locking in a direction V1 perpendicular to the plane of coupled panels 1 and a horizontal locking in a direction H1 perpendicular to the respective edges 2-3 and in the plane of the coupled panels 1 is obtained.

FIG. 2 further shows that the floor panel 1 comprises a board 11 and a provided thereon decorative layer 12. At the bottom of the board 11 a counterbalancing layer 13 is provided.

The board comprises a plurality of layers 14-15-16 having a different composition. In the example, the board 11 is a three layered board, with a centrally located layer 14 and two more outwardly situated layers 15-16 at each side of the central layer 14.

In the example, the centrally located layer 14 is based on magnesiumoxychloride or MOC and is directly adjacent to the two more outwardly situated layers 15-16 based on magnesiumoxysulphate, namely the outwardly situated layer 16 at the bottom and the outwardly situated layer 14 at the top.

It is clear that the illustrated board fulfils the features of the seventh independent aspect of the invention. With the top outermost layer 15 being based on magnesiumoxysulphate an enhanced adhesion with the decorative layer 12 can be obtained, especially in the present case were said decorative layer 12 comprise melamine resin. Moreover the more outwardly situated layers 15-16 may prevent leaching of the centrally located layer 14, which in itself brings an enhance structural strength to the board 11.

Preferably, the more outwardly situated layers 15-16 each comprise a higher cellulose content than the central layer 14. The cellulose content of the outer layers 15-16 may be 15 wt % or higher, while the cellulose content of the centrally located layer 14 is between 0 and 6 wt %.

The decorative layer 12 comprises a printed paper sheet 17 being treated with a melamine formaldehyde resin, wherein the paper sheet 17 has a raw paper weight of 50 to 100 grams per square meter and has a resin content of 50 to 130 grams per square meter dry weight. The decorative layer 12 further comprises an overlay, in this case a paper sheet 18 that is transparent or translucent in the obtained panel and applied on top of said printed paper sheet 17. Said overlay is treated with melamine formaldehyde resin as well, has a raw paper weight of 8 to 30 grams per square meter and a resin content of 30 to 100 grams per square meter. The overlay comprises, at its side facing said printed paper sheet 17, particles of aluminum oxide in an amount of 8-20 grams per square meter. Said counterbalancing layer 13 also comprises a paper sheet 19 and melamine formaldehyde resin, for example a paper sheet 19 having a raw paper weight of 70 to 100 grams per square meter and a resin content of 80 to 200 grams per square meter dry weight.

It is clear that the illustrated floor panel is an example of a coated panel having the characteristics of the first independent aspect of the invention.

The higher cellulose content in the upper outer layer 15 is beneficial for creating a sufficient adherence with the melamine formaldehyde resin containing top decorative layer 12. The lower cellulose content in the centrally located layer 14 ensures an acceptable dimensional stability of the coated panel 1 as a whole in changing ambient relative humidity.

It is noted that, in the example of FIG. 2, the groove 8 at said long pair of opposite edges 2-3 is bordered by an upper lip 20 and a lower lip 21, and, in this case, it is the lower lip 21 that comprises a locking element 10 taking part in said horizontal locking. The lower lip 21 is provided at least partially in the outer layer 16 situated at the bottom of said central layer 14, namely in a layer of the board that comprises cellulose fibers. Preferably, as is the case here, at least half of the thickness TL of the lower lip 21 at its thinnest zone 22 is formed by said lower outer layer 16.

In the example tongue-and-groove locking system, the lower lip 21 of the groove 8 is required to or resiliently deform upon coupling. The lower lip 21 can therefore be regarded as a critical area of the coupling system. Because of it being at least partially provided in the cellulose containing lower outer layer 16 of the board 11, the risk of failure of the lower lip 21 upon coupling and afterwards can be limited.

In the engaged condition of two or more of such panels 1 the locking elements 9-10 exert a tension force upon each other which forces the panels 1 towards each other. In the example the lower lip 21 of the groove 8 has an elastically bendable portion 23 which, in the engaged condition, is at least partially bent and in this manner provides the aforementioned tension force. Said bendable portion 23 is provided with a contact surface 24 which inwardly slopes downward.

Preferably, the coupling parts 6 and the locking means 9-10 are realized in one piece with the core or board 11 of the panels 1, e.g. floor panels.

The floor panels 1 illustrated in FIG. 2 further show the characteristics that the coupling parts 6 have such a shape that two subsequent floor panels can at least be engaged into each other by a turning movement W, whereby each subsequent floor panel 1 can be inserted laterally into the previous; that the coupling parts 6 provide in an interlocking, free from play, according to all directions in the plane which is situated perpendicular to the aforementioned edges 2-3; that the possible difference E between the upper lip 20 and lower lip 21 of the groove 8, measured in the plane of the panel and perpendicular to the longitudinal direction of the groove 8, is smaller than one time the total thickness T of the panel 1; that the total thickness T of each related panel 1 is larger than or equal to 5 mm, or even larger than or equal to 7 mm.

The tongue 7, or at least that part of the tongue 7 that protrudes beyond the upper edge is entirely realized in the centrally located layer 14. The part of the groove 8 cooperating with said part of the tongue 7 may also be entirely realized in the centrally located layer 14, as is the case here. As this layer 14 is based on magnesiumoxychloride an enhanced strength is obtained of the locking in the vertical direction V1.

Figure 3:
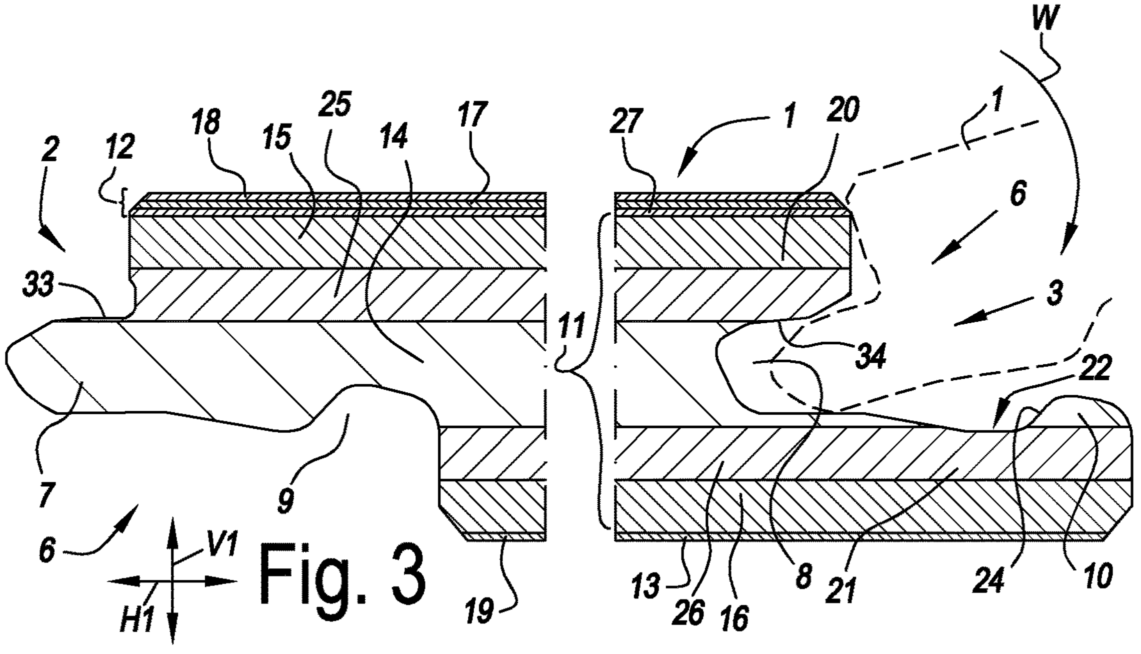
FIG. 3 in a similar view shows a variant.

FIG. 3 shows a similar example floor panel 1 as that illustrated by means of FIGS. 1 and 2, with two main differences, as explained here below.

A first difference is in that the board 11 of the FIG. 3 embodiment essentially comprises five layers 14-15-16-25-26 instead of three. In the example, the centrally located layer 14 is based on magnesiumoxychloride or MOC and is adjacent to the two intermediate layers 25-26 based on magnesiumoxysulphate. Said intermediate layers 25-26 are intermediate to the centrally located layer 14 and the outer layers 15-16 situated at the surface of the board 11. The centrally located layer 14 comprises 0 to 6 wt %, of cellulose based material, said outer layers 15-16 each have a cellulose content of 15 wt % or more and said intermediate layers 25-26 have an intermediate cellulose content, preferably of 5 to 15 wt % or 6 wt % to 15%. The intermediate layers 25-26 may be based on either of magnesiumoxychloride and magnesiumoxysulphate. Preferably, the intermediate layers 25-26 are based both on only one and the same of either magnesiumoxychloride and magnesiumoxysulphate. Most preferably, said intermediate layers are both based on magnesiumoxychloride. In such case, the illustrated example further shows the characteristic that the tongue 7, or at least that part of the tongue 7 that protrudes beyond the upper edge is entirely realized in layers that are based on magnesiumoxychloride, namely in the centrally located layer 14 and the upper intermediate layer 25. The part of the groove 8 cooperating with said part of the tongue 7 is also entirely realized in layers that are based on magnesiumoxychloride. As these layers 14-25-26 are based on magnesiumoxychloride an enhanced strength is obtained of the locking in the vertical direction V1.

A second difference is in that the board 11 of the FIG. 3 embodiment comprises a decorative layer 12 including, next to a printed paper sheet 17 and an overlay, also an underlay.

The underlay is, in this example, a paper sheet 27 treated with melamine formaldehyde resin, having a raw paper weight of 8 to 30 grams per square meter and a resin content of 20 to 80 grams per square meter dry weight. Even though the floor panel of FIG. 3 has a different decorative top layer 12 as compared to the example of FIG. 2, it does form an example of the first independent aspect of the invention as well, wherein the embodiment of FIG. 3 comprises the optional paper sheet 27, or underlay, below the printed paper sheet 17.

It is clear that the above two differences need not necessarily be combined.

With regard to FIG. 3, it is further remarked that, in this example the contact surfaces 33-34 between the tongue 7 and the bottom of the upper lip 20 of the groove 8 are entirely realized in the intermediate layer 25 adjacent to the upper outer layer 15.

Figure 4:
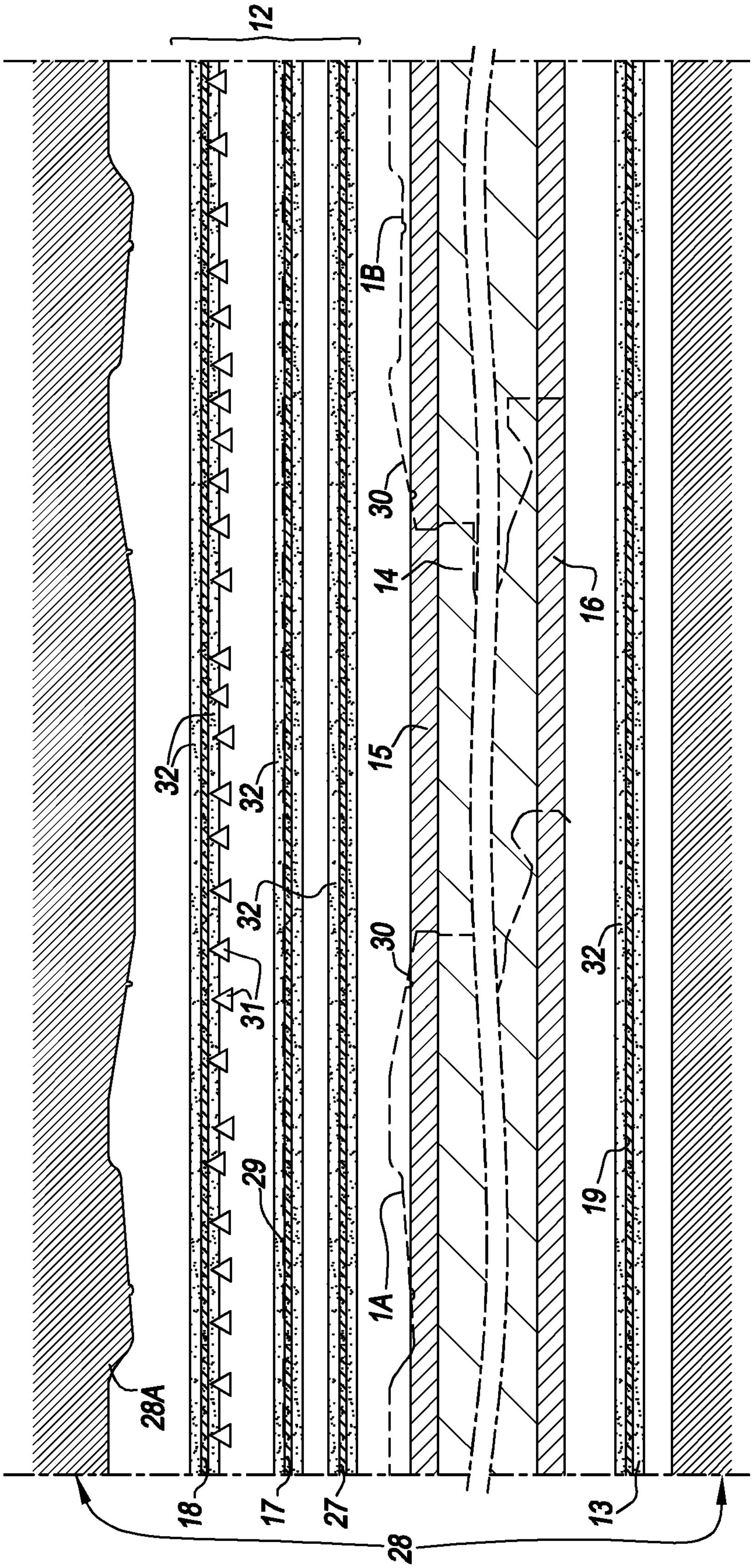
FIG. 4 schematically illustrates a method in accordance with the invention.

FIG. 4 schematically shows a method for manufacturing a coated panel similar to the panels illustrated in FIGS. 2 and 3. FIG. 4 illustrates that the printed paper sheet 17, the overlay with the transparent paper sheet 18, the optional paper sheet 27 for the underlay and the counterbalancing layer 13 is in the example, as well as is the case for the embodiments of FIGS. 1 to 3, cured, consolidated and adhered to the board 11 during one and the same pressing operation between heated press elements 28, for example using a DPL process. As shown here, the press element 28A contacting the overlay may be structured in order to from a relief in the surface or top side of the obtained coated panel 1A-1B. Such relief may correspond to the print 29 contained on the printed paper sheet. For example in the case of a wood print impressions imitating wood grains or grain lines may be provided in the surface. Preferably such wood grains or grain lines follow the course of the printed pattern 29.

The higher cellulose content at the upper outer layer 15 of the board 11 may accommodate deformations due to the forming of said relief. As shown here, the press element 28A is designed to form relatively deep relief or structure features, for example having a depth of 0.35 millimeter or more. The formation of deep structure features can also be eased due to the availability of said underlay.

In the present example, next to deep embossments formed in the actual upper surface of the coated panel 1, structure features forming a lower edge area at one or more of the edges of the coated panel 1 are achieved. In this case the lower edge area forms a bevel 30. FIG. 4 also illustrates by means of the contours 1A-1B of the obtained coated panels, that the upper outer layer 15 may be deformed somewhat to accommodate the deepest structure features, such as said bevels 30.

FIG. 4 further illustrates the presence of hard particles 31, such as particles of aluminum oxide at that side of the overlay which faces the printed paper sheet 17. The available resin 32 on the respective paper sheets 17-18-19-27 is also illustrated.

It is noted that, by means of the DPL pressing operation larger coated boards, or pressed wholes, are formed from which, by means of a dividing operation, such as a sawing operation, several floor panels 1A-1B may be formed. In FIG. 4 the contours of two floor panels 1A-1B adjacent in the larger coated boards are illustrated by means of the dashed lines.

In FIG. 4 an increased delamination resistance is obtained since the outer layers 15-16 are based on, or comprise, magnesiumoxysulphate and, in this case, also a cellulose content.

Figure 5:
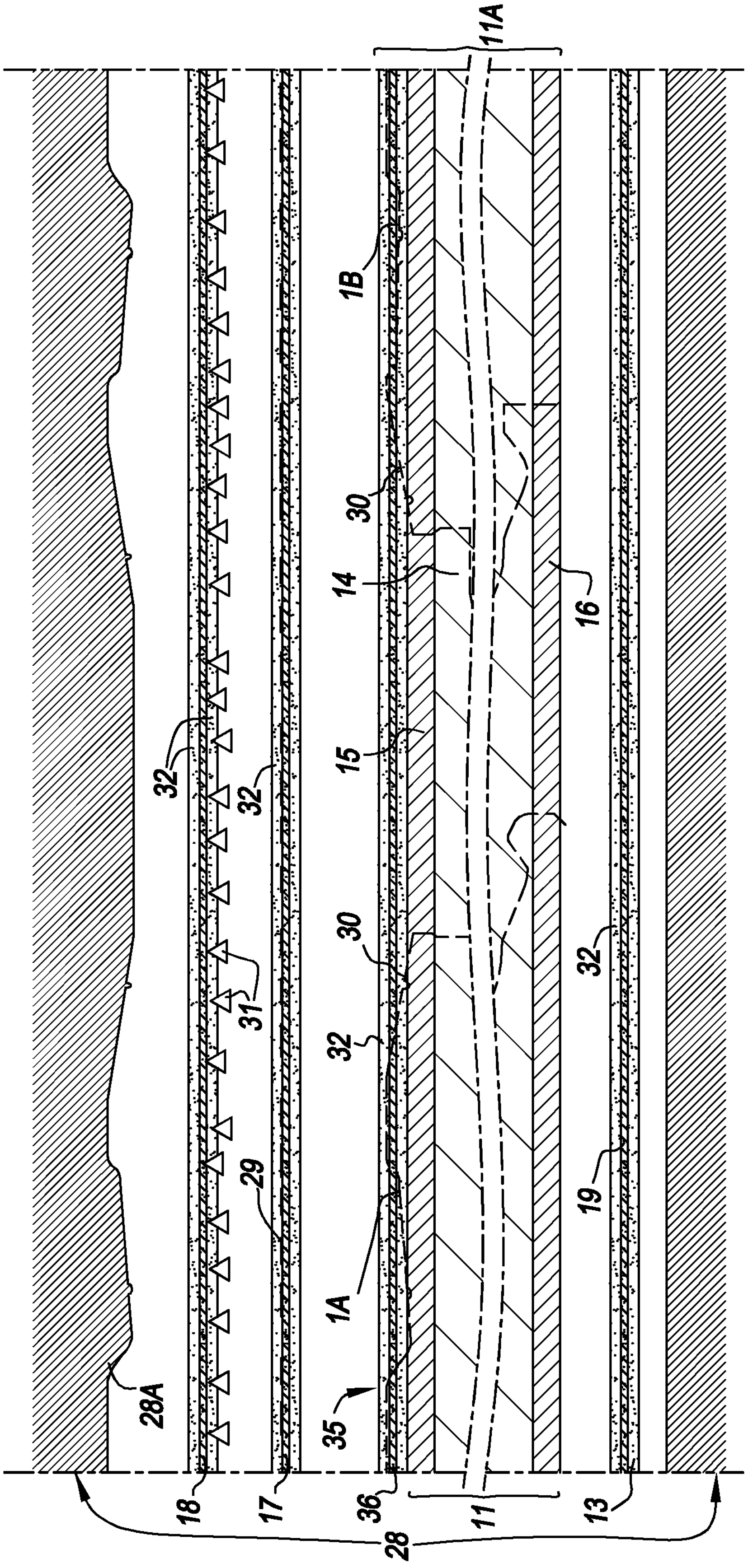
FIGS. 5 and 6 in a view similar to that of FIG. 4 illustrate variants.

FIG. 5 illustrates a variant where the board 11A comprises an aminoplast treated substrate 35 incorporated thereto during the production of the board 11A. The board 11A may for example be obtained, or be obtainable through a method according to the fourth or fifth independent aspect of the invention. In this case, said aminoplast treated substrate 35 is a paper sheet 36 impregnated with melamine resin 32. The aminoplast treated substrate 35 is provided at that surface of the board 11' upon which the printed paper sheet 17 is to be adhered. The printed paper sheet 17, the overlay with the transparent paper sheet 18 and the counterbalancing layer 13 have the same or substantially the same properties as described in connection to FIG. 4. In the obtained coated panel, said aminoplast treated substrate 35 will be available instead of said paper sheet forming the underlay in FIG. 4, and may be seen as part of the decorative layer 12 applied to the top of the board 11. Although not illustrated here, an aminoplast treated substrate may also available at the surface of said board 11A opposite to said surface upon which the printed paper sheet 17 is to be adhered.

Figure 6:
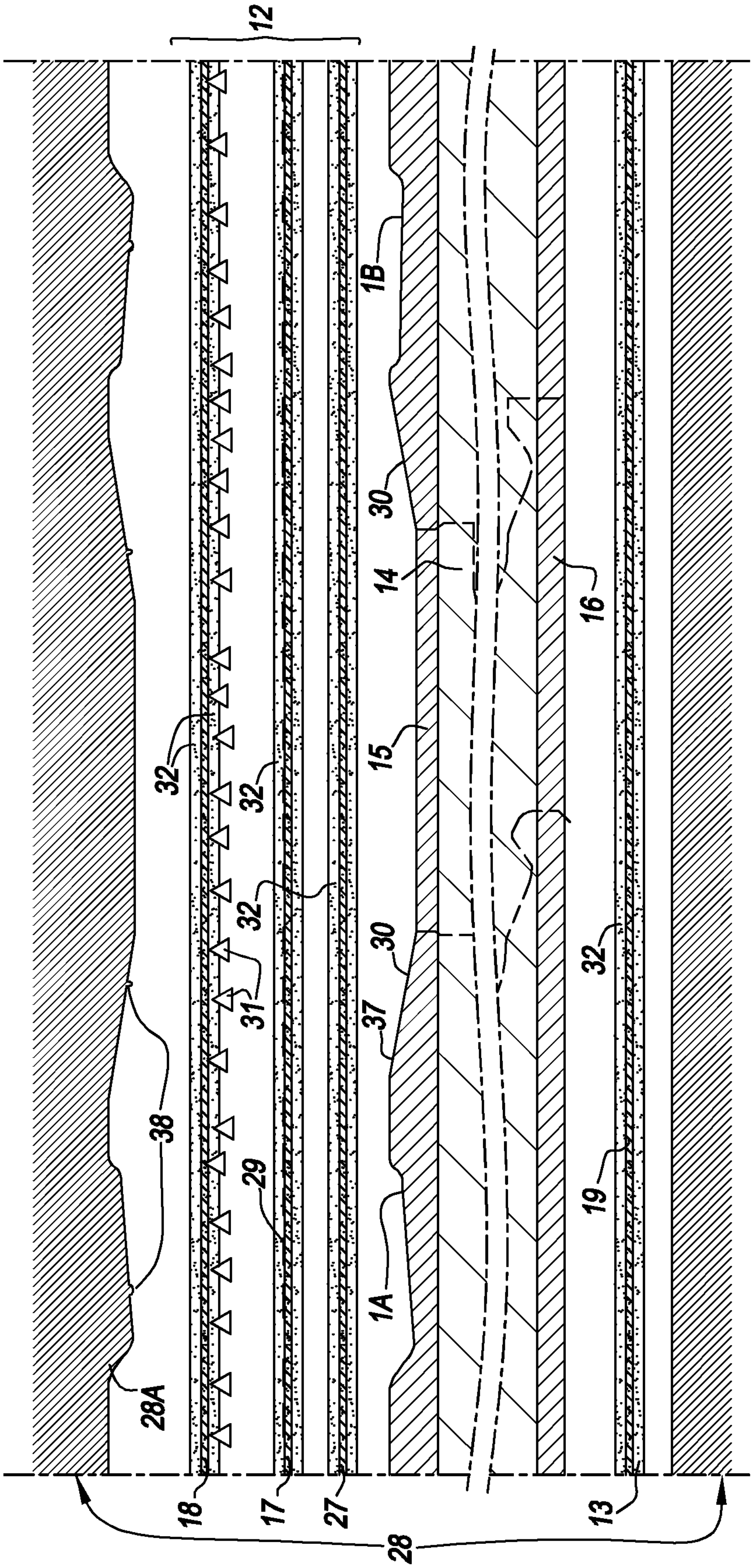

FIG. 6 illustrates a method which is generally the same as the method illustrated in FIG. 4, with this difference that the board 11 comprises a structured surface 37 upon which the decorative layer 12 is to be adhered. The board 11 is obtained or is obtainable with a method in accordance with the sixth independent aspect of the present invention. As is illustrated here, the structured surface 37 comprises some features of the finally to be obtained surface structure of the coated panels, for example at least a structured surface 37 coinciding or about coinciding with lowered edge areas forming a bevel 30. Relief features with a more limited size or depth can exclusively be realized by means of respective protrusions 38 on the press element 28A, here illustrated in the case of protrusions 38 for wood pore imitations. For example, relief features having a depth of 0.15 or less may be realized exclusively by means of respective protrusions on the press element 28A, while at least relief features forming lowered edges are formed in the surface of the board 11 during its production, in accordance e.g. with the sixth independent aspect of the present invention.

Using a prestructured board 11, as in FIG. 6, leads to a minimized risk of pressure defects in areas having deep relief features.

It is noted that the boards 11 illustrated in the FIGS. 1 to 6 are symmetric or substantially symmetric through their thickness, i.e. the layers 15-16-25-26 at both sides of a centrally located layer 14 show a thickness, composition and order that results in a symmetric build-up as seen from the middle of the thickness of the board 11.

Figure 7:
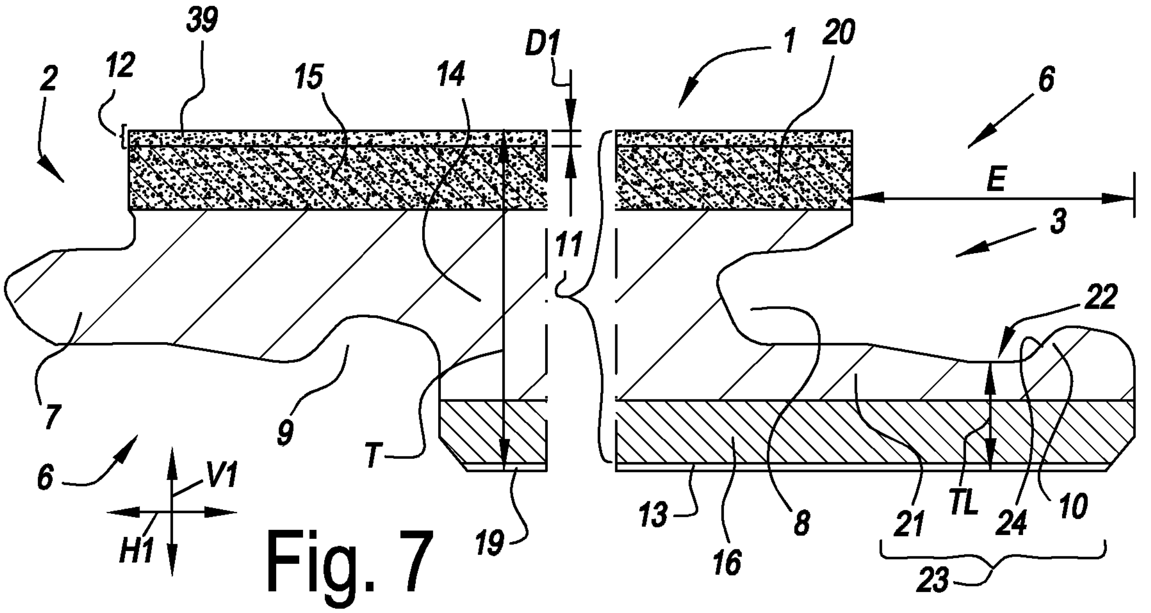
FIG. 7 in a view similar to that of FIGS. 2 and 3 illustrate another floor panel.

FIG. 7 shows a coated panel in the form of a floor panel 1 with the characteristics of the eighth independent aspect of the present invention. The floor panel 1 comprises a board 11 that comprises MOC and/or MOS with a decorative layer 12 formed at the surface of said board 11. The decorative layer 12 is free from paper layers and comprises a mix 39 of at least aminoplast resin, stone powder, e.g. particles of aluminumoxide, and coloring pigments. The coloring pigments are available from the top surface upto a depth D1 in said panel of 0.25 millimeter or more.

In the represented example said mix 39 has been provided in one of the outer layers 15 of a three layered board. Such an embodiment may be obtained through the second possible method for manufacturing a coated panel having the characteristics of the eighth aspect, as mentioned in the introduction.

Figure 8:
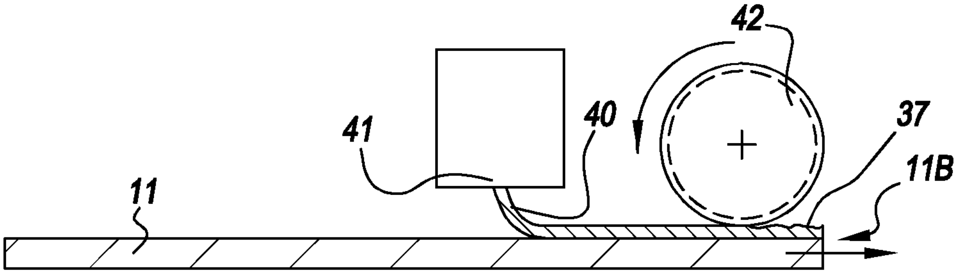
FIG. 8 illustrates some steps in a method in accordance with the tenth independent aspect of the invention.
Figure 9:
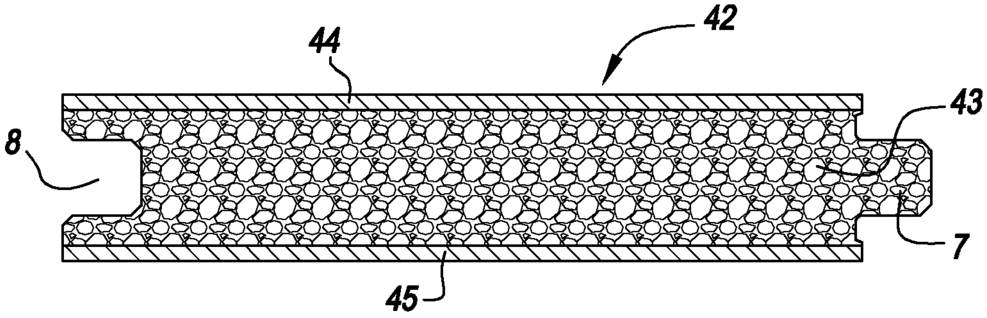
FIG. 9 illustrates a panel in accordance with the eleventh independent aspect of the invention.

FIG. 8 illustrates that a board 11B may be manufactured, in accordance with the tenth independent aspect of the invention, by at least extruding a suitable slurry 40, for example one of the slurries disclosed in the introduction, through a die 41. In this case the extrusion operation is a continuous operation. The subsequent curing operation is not illustrated here.

In the illustrated example, the slurry 40 is extruded on top of a board 11, which is in itself a board of MOC or MOS.

As illustrated here, the extruded slurry 40 is textured by means of an embossing roller 42 in line with the extrusion. In so doing a method also having the features of the sixth independent aspect may be obtained, and the produced board 11B will have a structured surface 37, for example comparable to the structured surface 37 of the board 11 in FIG. 6.

Figure 11:
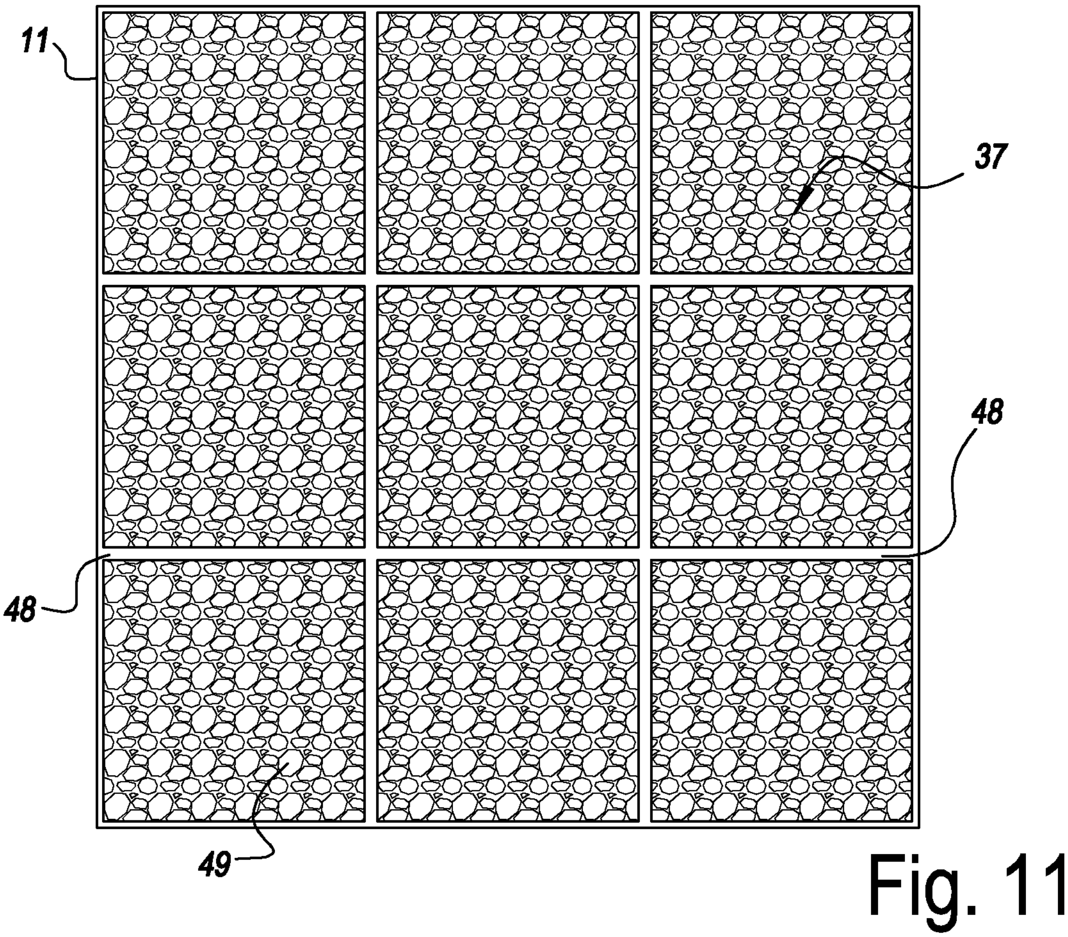
FIG. 11 illustrates a panel obtained through such method.

FIG. 11 shows an insulated panel 42 in accordance with the eleventh independent aspect of the present invention. The panel 42 comprises a thermally insulating material 43, centrally located between a top layer 44 and bottom layer 45 based on MOS or MOC. In this case the insulating material 43 is a foam, preferably a rigid form, for example PIR or phenol foam. The top layer 44 and bottom layer 45 form a skin to the thermally insulating material 43.

The illustrated insulated panel 42 comprises at least two opposite edges having a tongue 7 and groove 8 structure. Upon connection a seamless joint can be obtained, completely shielding the thermally insulating material 43 from the exterior. Next to an enhanced fire resistance, a barrier against leaching of thermally insulation gas from within cells of the thermally insulating foam is obtained, and the insulation capability of the thermally insulation material 43 may decay at a lowered rate.

Figure 10:
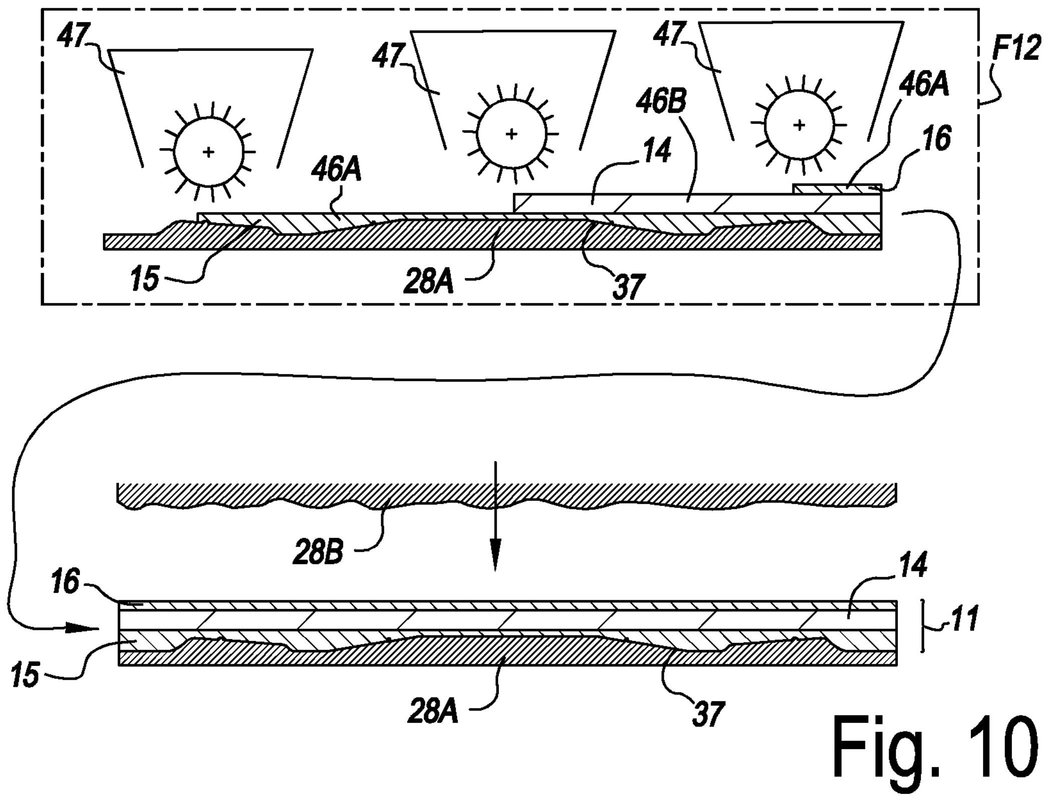
FIG. 10 illustrates some steps in a method in accordance with the twelfth independent aspect of the invention.

FIG. 10 illustrates a method for manufacturing a board 11 having a structured surface 37. The method represents the characteristics of the twelfth independent aspect of the present invention. A structured element 28A is provided. On the structured element 28A several powders 46A-A6B are deposited in subsequent scattering stations 47. In the represented example a three layered board 11 is obtained, wherein the outer layers 15-16 comprise MOS, while the centrally located layer 14 comprises MOC. Clearly the powder 46A for forming said outer layers 15-16 comprises at least MgO and MgSO4, while the powder 46B for forming the centrally located layer 14 comprises at least MgO and MgCl2. It is further noted that the respective powders 46A-46B may comprises further components such as a content of cellulose, for example in accordance with the content contained in the board 11 of FIG. 2.

FIG. 10 further illustrates that the first deposited powder 46A is that for the outer layer 15 that it is to form the top layer of the board 11.

FIG. 10 further illustrates that an embossment is also formed at the bottom of the board 11 by means of an additional press element 28B used on top of the finally deposited powder 46A, i.e. the powder for forming the outer layer 16 present at the bottom of the board 11. Said embossing can be carried out in one and the same press treatment as a press treatment used for solidifying or curing the deposited powders 46A-46B. Preferably all deposited layers, namely the powder for the outer layers 15-16 and the powder for the centrally located layer 14, are cured at once.

FIG. 11 shows an example of a board 11 obtained or obtainable through a method in accordance with the twelfth independent aspect of the invention. In this case, the structured surface 37 comprises lower edge areas 48 imitating one or more groutlines. The structured surface 37 further comprises one or more areas 49 imitating stone or ceramic surfaces. In the example, said areas 49 are adjacent to one ore more of said lower edge areas 48 imitating groutlines.

Figure 12:
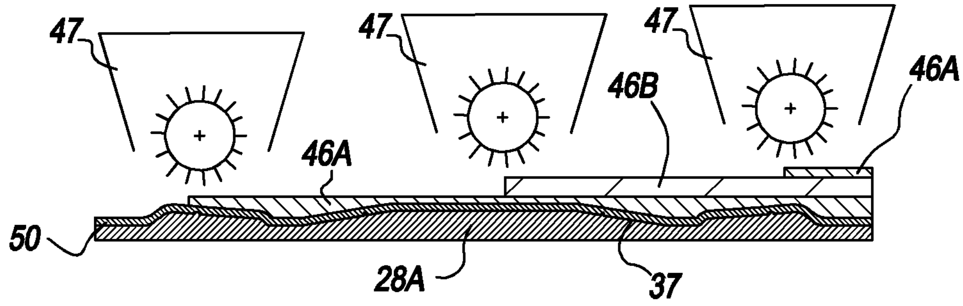
FIG. 12 in a view on the area indicated with F12 in FIG. 10 illustrates a variant.

FIG. 12 show a variant of the method illustrated in FIG. 11, wherein said powders 46A-46B are deposited on said structured element 28A with the intermediate of a base layer 50. The base layer 50 is preferably a white printable paper layer. The adherence of said base layer 50 with the deposited powder 46A is obtained upon solidification of the deposited powder, for example in a subsequent pressing operation as illustrated by means of FIG. 10. In this way a board 11 can be obtained having a structured top surface with excellent printability for example apt for receiving a digital inkjet print with waterbased inks. The obtained board 11 may comprise titaniumoxide or be white at the printable surface, for example in that said base layer 50 is a paper layer filled with titaniumoxide.

Figure 13:
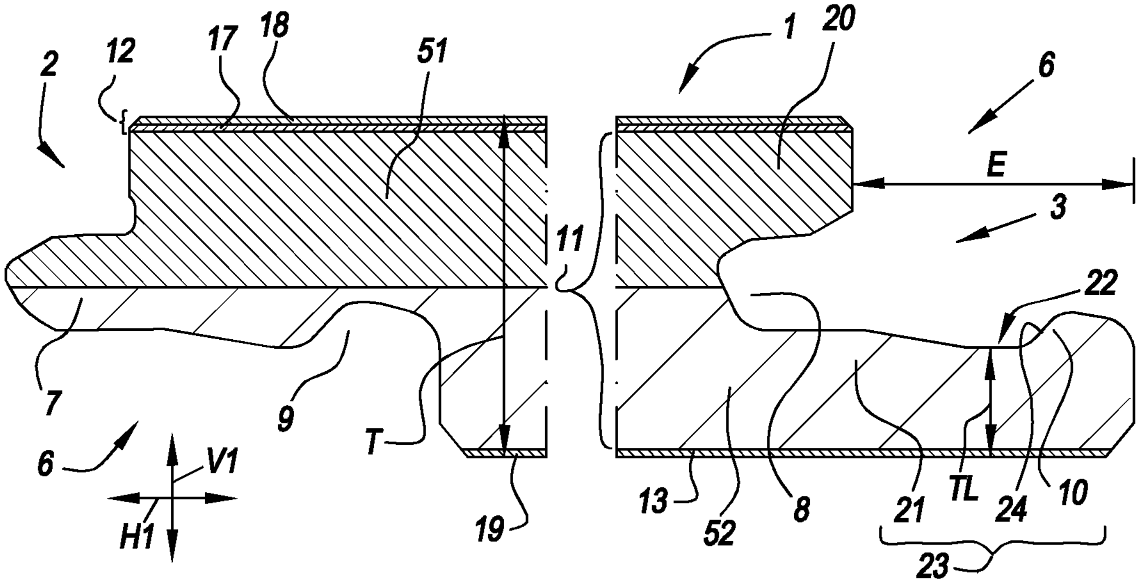
FIG. 13 in a view similar to that of FIGS. 2 and 3 illustrate a floor panel comprising a board with the characteristics of the thirteenth independent aspect of the invention.

FIG. 13 shows a floor panel 1 comprising a board having the characteristics of the thirteenth independent aspect of the present invention. The board 11 comprises MOS or MOC and further comprises rock wool fibers. In the example, said rockwool fibers are contained in a layer 51 of said board 11 which is substantially free from MOS and MOC. The layer 51 having the rockwool fibers is an outermost layer, namely a layer present at the top surface of said board 11, or in other words a top layer of the board 11, and provides for an increased delamination resistance of the decorative layer 12. Said layer 51 having the rockwool fibers has a density of 800 kg per cubic meter or more and essentially comprises rockwool fibers bound by means of an aminoplast glue, preferably ureum formaldehyde and/or melamine formaldehyde.

The board 11 of the floor panel 1 further comprises a layer 52 that comprises MOC and/or MOS. In the example the board 11 is essentially composed of the layer 51 having the rockwool fibers and the layer 51 comprising the MOC and/or MOS.

The decorative layer 12 of the floor panel 1 of FIG. 13 may further show the same or similar properties as is the case for the floor panels of FIGS. 1 to 3 and may be obtained through a method similar or the same as the method illustrated in FIGS. 4 to 6.

According to an embodiment not illustrated here, said layer 50 comprising the rockwool fibers may extend exclusively at a level above the tongue 7 and groove 8, i.e above the vertically active contact surfaces 33-34 at the top of the tongue and the bottom of the upper lip 20 of the groove 8. According to still another embodiment not illustrated here, a layer comprising rockwool fibers may also be available at the bottom of the board 11, such that said layer 51 comprising MOC or MOS is a centrally located layer situated between two layers comprising rockwool fibers and potentially aminoplast glue.

Figure 14:
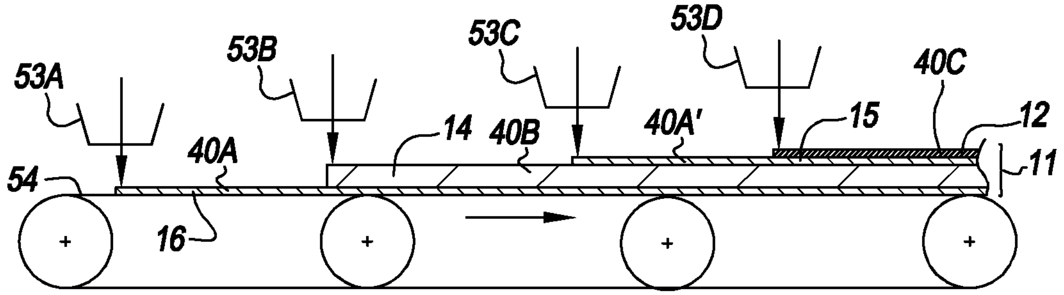
FIG. 14 illustrates some steps in a method ideally suited for manufacturing a board having the characteristics of the thirteenth independent aspect of the invention.

FIG. 14 illustrates a method for manufacturing a board 11 having multiple layers 12-14-15-16, including a decorative layer 12, of different mineral materials. Said board 11 is manufactured by serial depositing of slurries 40A-40B-40A'-40C having a respective mineral material composition. The depositing of the respective layers is carried out by means of depositing stations or pouring stations 53A-53B-53C-53D positioned along the trajectory of a conveying means 54. In the represented example, the board 11 is manufactured by

- depositing or pouring a first MgO containing slurry 40A from a first pouring station 53A on a conveyor means 54, such as a conveyor belt. Said first MgO containing slurry 40A may be a slurry 40A suitable to form MOC or MOC;

depositing or pouring a second MgO containing slurry 40B from a second pouring station 53B on said conveyor means 54, i.e. preferably on top of said first MgO containing slurry 40A. Said second MgO containing slurry 40B is preferably different from said first MgO containing slurry 40A;

depositing or pouring a third MgO containing slurry 40A' from a third pouring station 53C on said conveyor means 54, i.e. preferably on top of said second MgO containing slurry 40B. Said third MgO containing slurry 40A' is substantially the same as said first MgO containing slurry 40A;

depositing or pouring a final slurry 40C from a fourth pouring station 53D on said conveyor means 54, i.e. preferably on top of said third MgO containing slurry 40A', wherein said final slurry comprises a mineral material different from MgO and is preferably free from MgO. Preferably said mineral material comprises concrete, for example so-called UHPC.

It is clear that after deposition of the respective slurries 40A-40B-40A'-40C, the deposited material may be solidified, e.g. by curing, to form the board 11. Preferably the final slurry 40C forms the decorative layer 12 of a panel, such as floor panel or wall panel, comprising such board material.

Figure 15:
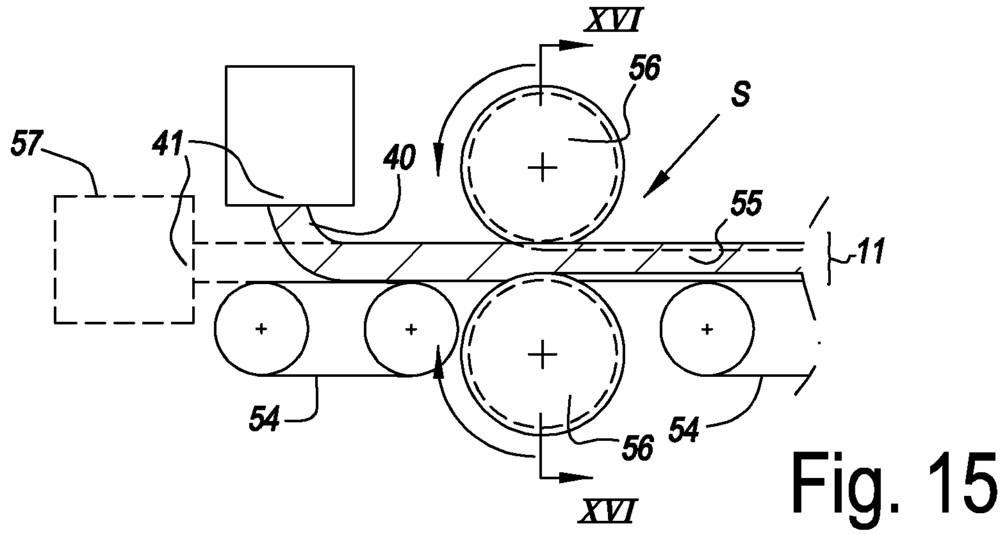
FIG. 15 illustrates some steps in a method in accordance with the fifteenth aspect of the invention.
Figure 16:
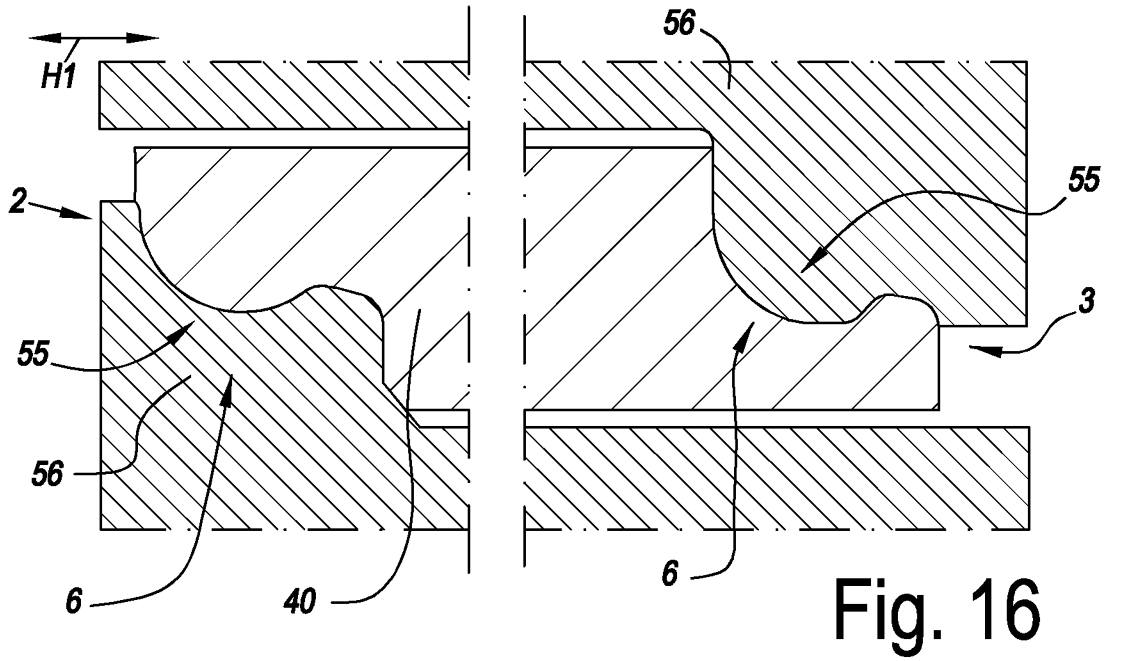
FIG. 16 on a larger scale shows a cross-section in accordance with the line XVI-XVI in FIG. 15.

FIGS. 15 and 16 illustrate some steps in a method for manufacturing a board 11 in accordance with the fifteenth independent aspect of the present invention. The method comprises extruding a slurry 40 suitable for forming MOC or MOS through a die 41. In accordance with said fifteenth aspect, the method comprises the step S of forming profiles 55 to one or more edges 2-3 of the extruded material. The profiles 55 are formed prior to the extruded material becoming solid or cured for example in a subsequent solidification or curing step.

In the example said step S of forming is realized by means of two shaped elements 56 indenting the slurry 40. The shaped elements 56 are rollers having a structured circumference. One shaped element 56 indents said slurry 40 from the bottom and the other shaped element 56 indents said slurry 40 from the top. Preferably said two shaped elements 56 are active, as illustrated here, at least partially vertically above each other.

The profiles 55 comprise coupling parts 6 as illustrated in FIG. 16. The illustrated coupling parts 6 in a coupled condition result in a locking between the respective edges 2-3 in a horizontal direction H1. The profiles 55 are free from contour portions that are both vertically underneath the top surface and vertically underneath the bottom surface of the slurry 40.

It is clear that the method illustrated by means of FIGS. 15 and 16 also shows the features of the tenth independent aspect of the invention. The extrusion die 41 is here located above the conveyor means 54, and the slurry 40 is bent and conveyed transversely along the trajectory of said conveyor means 54. In dashed line 57 an alternative set-up is shown, wherein the extrusion die 41 is directed parallel or about parallel with the trajectory of the conveyor means 54. In this case the slurry 40 in the dashed line is extruded in line or about in line with the trajectory it is to take on the conveyor means. It is further noted that, in accordance with a not represented embodiment, several extrusion dies may be used to deposit extruded slurry, potentially of mutually different composition, for example in order to form a three layered board. One or more of such extrusion dies may be positioned vertically above the trajectory of the conveyor means, and one or more of such extrusion dies may be positioned parallel, or practically parallel, with said trajectory. In the case of a three layered board, preferably the extrusion die for depositing the material of the centrally located layer is positioned inline, or practically in line with the trajectory. In the case of a three layered board, one and the same extrusion die may be used for forming both more outwardly situated layers, in that the extruded slurry is split after extrusion into the material of the respective more outwardly situated layers and in that the material of said centrally located layer is extruded in between.

Figure 17:
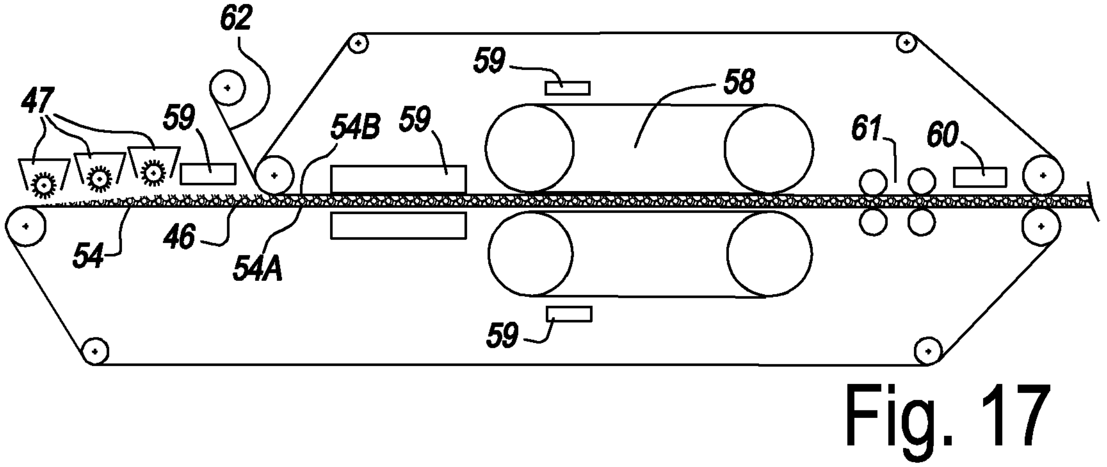
FIG. 17 illustrates some steps in a method in accordance with the sixteenth aspect of the invention.

FIG. 17 illustrates some steps in a method in accordance with the sixteenth independent aspect of the present invention. Using subsequent scattering stations 47 a powder 46 is deposited on a conveyor means 54. The scattering stations 47 and powders 46A-46B from FIG. 10 or 12 may be used. The powder is deposited on a lower Teflon belt 54A, and is conveyed between said lower Teflon belt 54B and an upper Teflon belt downstream of said scattering stations 47. The Teflon belts 54A-54B convey the deposited powder toward and through a twin belt press, in this case an isochoric steel belt press 58, where the powder is compressed.

Several heaters 59 or coolers 60 may be available along the trajectory of said conveyor means and/or twin belt press 58. A separate thickness calibration unit 61 may be available downstream of said twin belt press.

FIG. 17 further illustrates that a web-shaped material 62 may be conveyed along with and on top of the deposited powder 46. This web-shaped material 62 may be either of an aminoplast treated substrate, a printable layer, a decor layer or a reinforcement layer, such as a glass fiber layer, woven or non-woven. In case the web-shaped material 62 is an aminoplast substrate an embodiment of the fifth independent aspect may be attained, wherein the deposited powder 46 is allowed to become at least partially sintered, in the presence of said aminoplast treated substrate, namely in said twin belt press. In case the web-shaped material 62 is a printable layer a board may be obtained that at a surface thereof comprises titaniumoxide and/or is white. Preferably such printable layer is a printing base paper having a Gurley value of 25 seconds or below.

It is remarked that in accordance with all methods disclosed herein, larger boards may be formed from which by means of a dividing operation, such as a sawing or water cutting operation, smaller panels can be obtained, for example panels having the approximate dimensions of a final finished floor panel or wall panel. Preferably said larger board is divided in smaller panels after being solidified or cured. It is further clear that the provision of the decorative layer 12 may either be obtained during the formation of the board, i.e. before solidifying or curing of the board, after solidifying curing of the board but before said dividing operation, or after said dividing operation.

Throughout the description deposition or scattering of powder, dry blends or particles has been used interchangeably and these terms should be understood as referring to the deposition or scattering of a uniform or premixed particulate material as the case may be.

The aspects and concepts disclosed in the claims and drawings may be combined with one another as long as they are not mutually contradictory.

The present invention is in no way limited to the above described embodiments, but such methods, boards and coated panels may be realized according to several variants without leaving the scope of the invention.

The invention claimed is:

1. A coated panel comprising a board, wherein said board comprises $5Mg(OH_2)\cdot MgSO_4\cdot 7H_2O$;

wherein said coated panel comprises a decorative layer provided on said board;

wherein said decorative layer comprises thermosetting resin, and the decorative layer further comprises a printed paper sheet and/or an overlay paper and/or an underlay paper and/or a wood veneer;

wherein the thermosetting resin of the decorative layer bonds the decorative layer to the board, wherein the thermosetting resin extends into and is cured within pores of the board; and wherein the thermosetting resin is melamine.

2. The coated panel in accordance with claim 1, wherein the board comprises at least one layer based on MgO and MgSulphate.

3. The coated panel in accordance with claim 1, wherein the board comprises at least two layers having a mutually different composition, wherein a first layer of said at least two layers comprises or is obtained from at least MgO and MgChloride, while a second layer of said at least two layers comprises or is obtained from at least MgO and MgSulphate.

4. The coated panel in accordance with claim 1, wherein the board comprises at least two layers having a mutually different composition, wherein a first layer of said at least two layers is based on magnesiumoxychloride, while a second layer of said at least two layers is based on magnesiumoxysulphate.

5. The coated panel in accordance with claim 1, wherein said board comprises at least three layers, wherein a layer based on magnesiumoxychloride is adjacent to two layers based on magnesiumoxysulphate, wherein said two layers comprise a first layer at a bottom of the magnesiumoxychloride based layer and a second layer at a top of the magnesiumoxychloride based layer.

6. The coated panel in accordance with claim 1, wherein said board comprises at least three layers, wherein a layer based on magnesiumoxysulphate is adjacent to two layers based on magnesiumoxychloride, wherein said two layers comprise a first layer at a bottom of the magnesiumoxysulphate based layer and a second layer at a top of the magnesiumoxysulphate based layer.

7. A panel, wherein the panel is a floor, wall or ceiling panel, wherein the panel comprises a coated panel as in claim 1;

wherein the board is provided at least two opposite edges with coupling means allowing to couple two such panels at the respective edges, wherein a vertical locking perpendicular to the plane of coupled panels and/or a horizontal locking perpendicular to the respective edges and in the plane of the coupled panels is obtained;

wherein said coupling means are basically shaped as a tongue and a groove, wherein the groove is bordered by an upper lip and a lower lip.

8. The panel in accordance with claim 7, wherein said lower lip and/or said upper lip comprises a locking element taking part in said horizontal locking, wherein the respective lip is at least partially provided in a layer of the board that comprises cellulose fibers and/or magnesiumoxychloride.

* * * * *